US012803853B2

(12) United States Patent
Liu et al.

(10) Patent No.: US 12,803,853 B2
(45) Date of Patent: Nov. 17, 2026

(54) METHOD OF TRANSMITTING AND RECEIVING SYMBOLS OVER AN ORTHOGONAL TIME FREQUENCY SPACE COMMUNICATION CHANNEL SUBJECT TO DOPPLER SPREAD, AND TRANSMITTER AND RECEIVER IMPLEMENTING THE METHOD

(71) Applicants: AUMOVIO Germany GmbH, Frankfurt am Main (DE); NANYANG TECHNOLOGICAL UNIVERSITY, Singapore (SG)

(72) Inventors: Yujie Liu, Singapore (SG); Yong Liang Guan, Singapore (SG); David González González, Frankfurt am Main (DE)

(73) Assignees: AUMOVIO GERMANY GMBH; NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 19/155,784

(22) PCT Filed: Feb. 13, 2024

(86) PCT No.: PCT/IB2024/051314
§ 371 (c)(1),
(2) Date: Aug. 12, 2025

(87) PCT Pub. No.: WO2024/171041
PCT Pub. Date: Aug. 22, 2024

(65) Prior Publication Data

US 2026/0121898 A1 Apr. 30, 2026

(30) Foreign Application Priority Data

Feb. 15, 2023 (DE) ........................ 102023103728.5
Apr. 30, 2023 (DE) ........................ 102023111169.8

(51) Int. Cl.
*H04L 27/26* (2006.01)
*H04L 25/02* (2006.01)

(52) U.S. Cl.
CPC ........ *H04L 27/261* (2013.01); *H04L 25/0202* (2013.01); *H04L 27/2639* (2013.01)

(58) Field of Classification Search
CPC ............... H04L 27/261; H04L 25/0202; H04L 27/2639
See application file for complete search history.

(56) References Cited

U.S. PATENT DOCUMENTS 10,673,659 B2 6/2020 Hadani et al.

FOREIGN PATENT DOCUMENTS

CN 115086114 A 9/2022
DE 102021126321 A1 12/2022
(Continued)

OTHER PUBLICATIONS

Zhang et al. "An Efficient Channel Estimation Scheme for Short Frame OTFS Using Impulse-Train Pilots," GLOBECOM 2022-2022 IEEE Global Communications Conference, Rio de Janeiro, Brazil, 2022, pp. 5929-5934 (Year: 2022).*
(Continued)

*Primary Examiner* — Sam K Ahn
*Assistant Examiner* — Amneet Singh
(74) *Attorney, Agent, or Firm* — Buchanan Ingersoll & Rooney P.C.

(57) ABSTRACT

A method of transmitting a binary data sequence over an OTFS communication channel subject to Doppler-spread is provided. The method implements an optimisation of the power ratio of pilot signals using solely information readily available at the transmitter, foregoing the need to perform end-to-end simulations or trials. A corresponding receiver performs a two-staged iterative channel estimation, signal detection, de-mapping and data-decoding, with information
(Continued)

obtained from the decoded data being iteratively fed back to the channel estimation, signal detection, de-mapping and data decoding.

13 Claims, 16 Drawing Sheets

(56) References Cited

FOREIGN PATENT DOCUMENTS

| | | | |
|---|---|---|---|
| DE | 102022106409 | A1 | 4/2023 |
| DE | 102023111169 | B4 | 5/2025 |
| WO | 2022/248446 | A1 | 12/2022 |

OTHER PUBLICATIONS

Yuan et al., "New delay Doppler communication paradigm in 6G era: A survey of orthogonal time frequency space (OTFS), " in China Communications, vol. 20, No. 6, pp. 1-25, Jun. 2023 (Year: 2023).*
Long et al. "Joint Channel Estimation and Equalization for OTFS Based on EP," 2021 IEEE Global Communications Conference (GLOBECOM), Madrid, Spain, 2021, pp. 01-06 (Year: 2021).*
Zhang et al. "Modulation Symbol Cancellation for OTFS-Based Joint Radar and Communication, " 2021 IEEE International Conference on Communications Workshops (ICC Workshops), Montreal, QC, Canada, 2021, pp. 1-6 (Year: 2021).*
"5G; Study on channel model for frequencies from 0.5 to 100 Ghz (3GPP TR 38.901 version 14.0.0 Release 14)" ETSI TR 138 901 V14.0.0, (May 2017), pp. 1-90.
Ge et al., "OTFS Signaling for Uplink NOMA of Heterogeneous Mobility Users" IEEE Transactions on Communications, (May 2021), vol. 69, No. 5, pp. 3147-3161.
Li et al., Low Complexity Receiver via Expectation Propagation for OTFS Modulation, IEEE Communications Letters, (Oct. 2021), vol. 25, No. 10, pp. 3180-3184.
Liu et al., "BEM OTFS Receiver with Superimposed Pilots over Channels with Doppler and Delay Spread", ICC 2022—IEEE International Conference on Communications, (May 2022), pp. 2411-2416.
Liu et al., "Near-Optimal BEM OTFS Receiver With Low Pilot Overhead for High-Mobility Communications", IEEE Transactions on Communications, (May 2022), vol. 70, No. 5, pp. 3392-3406.
Mishra et al., "Iterative Channel Estimation and Data Detection in OTFS Using Superimposed Pilots", 2021 IEEE International Conference on Communications Workshops (ICC Workshops), (Jun. 2021), pp. 1-6.
Singh et al., "Low-Complexity LMMSE Receiver Design for Practical-Pulse-Shaped MIMO-OTFS Systems", IEEE Transactions on Communications, (Dec. 2022), vol. 70, No. 12, pp. 8383-8399.
Thaj et al., "Low Complexity Iterative Rake Decision Feedback Equalizer for Zero-Padded OTFS Systems", IEEE Transactions on Vehicular Technology, (Dec. 2020), vol. 69, No. 12, pp. 15606-15622.
Yuan et al., "Iterative Detection for Orthogonal Time Frequency Space Modulation With Unitary Approximate Message Passing", IEEE Transactions on Wireless Communications, (Feb. 2022), vol. 21, No. 2, pp. 714-725.
Zhang et al., "Delay-Doppler domain decision feedback turbo equalization for OTFS modulation", Physical Communication, (Jun. 2022), vol. 52, 101699, pp. 1-8.
Office Action (Grant Decision) issued Feb. 10, 2025, by the German Patent Office in corresponding German Patent Application No. 10 2023 111 169.8 and an English translation of the Office Action. (12 pages).
International Search Report (PCT/ISA/210) and Written Opinion (PCT/ISA/237) mailed on Jul. 1, 2024, by the European Patent Office as the International Searching Authority for International Application No. PCT/IB2024/051314. (17 pages).
Kim et al., "Turbo Equalization for Doubly-Selective Fading Channels Using Nonlinear Kalman Filtering and Basis Expansion Models", IEEE Transactions on Wireless Communications, vol. 9, No. 6, Jun. 2010. pp. 2076-2087. (12 pages).
Mishra, et al., "OTFS Channel Estimation and Data Detection Designs With Superimposed Pilots", Oct. 28, 2020, pp. 1-30. (30 pages).
Movahedian et al., "Estimation of Fast-Fading Channels for Turbo Receivers With High Order Modulation", IEEE Transactions on Vehicular Technology, vol. 62, No. 2, Feb. 2013, pp. 667-678. (12 pages).
Huiyang, "Low-Dimensional Subspace Estimation of Continuous-Doppler-Spread Channel in OTFS Systems", University of Glasgow, pp. 1-15. (16 pages).
Raviteja et al., "Interference Cancellation and Iterative Detection for Orthogonal Time Frequency Space Modulation", Feb. 16, 2018, pp. 1-30. (30 pages).
Yuan et al., "Data-Aided Channel Estimation for OTFS Systems With a Superimposed Pilot and Data Transmission Scheme", IEEE Wireless Communications Letters, vol. 10, No. 9, Sep. 2021. (5 pages).
German Office Action with English translation issued in corresponding Patent Application No. 102023111169.8 dated Nov. 29, 2023, 14 pages.

* cited by examiner

METHOD OF TRANSMITTING AND RECEIVING SYMBOLS OVER AN ORTHOGONAL TIME FREQUENCY SPACE COMMUNICATION CHANNEL SUBJECT TO DOPPLER SPREAD, AND TRANSMITTER AND RECEIVER IMPLEMENTING THE METHOD

CROSS REFERENCE TO RELATED APPLICATIONS

This application is the U.S. National Phase Application of PCT International Application No. PCT/IB2024/051314, filed Feb. 13, 2024, which claims priority to German Patent Application Nos. 10 2023 103 728.5, filed Feb. 15, 2023, and 10 2023 111 169.8, filed Apr. 30, 2023, the contents of such applications being incorporated by reference herein.

FIELD OF THE INVENTION

The present invention relates to a method of transmitting and receiving symbols over an orthogonal time frequency space (OTFS) communication channel subject to Doppler spread and a transmitter and a receiver implementing the method.

Notations

Throughout this specification, bold symbols represent vectors or matrices. Scalar values are denoted herein by lowercase letters in italics, as in x. Superscripts T, H and †, respectively denote the transpose, complex conjugate transpose and pseudo inverse of a vector or matrix. diag {a} is a diagonal matrix with vector a on its diagonal, while diag {A} is a vector whose elements are from the diagonal of matrix A. ⊗ is the Kronecker product.

BACKGROUND

The sixth generation (6G) wireless communications and beyond are expected to serve a large number of high-mobility users, e.g., vehicles, subways, highways, trains, drones, low earth orbit (LEO) satellites, etc.

The preceding fourth and fifth generation (5G) wireless communications use orthogonal frequency division multiplexing (OFDM), which provides high spectral efficiency and high robustness against frequency selective fading channel, and also allow for using low-complexity equalisers. However, due to speed-dependent Doppler shifts or spreads and quickly varying multipath reception, high-mobility communications suffer from severe time and frequency dispersiveness. Time and frequency dispersiveness each cause signal fading at the receiver, and the fading is thus also referred to as doubly selective channel fading. Doubly selective channel fading significantly impairs the performance of OFDM communication.

As an alternative to OFDM, orthogonal time frequency space (OTFS) has been regarded as a promising modulation technique in the sixth generation (6G) wireless communications, as a solution for coping with doubly selective fading channels.

OTFS modulation is a 2D modulation scheme that multiplexes information QAM symbols over carrier waveforms that correspond to localized pulses in a signal representation that is referred to as delay-Doppler representation. The OFTS waveforms are spread over both time and frequency while remaining roughly orthogonal to each other under general delay-Doppler channel impairments. In theory, OTFS combines the reliability and robustness of spread spectrum with the high spectral efficiency and low complexity of narrowband transmission.

The OTFS waveforms couple with the wireless channel in a way that directly captures the underlying physics, yielding a high-resolution delay-Doppler Radar image of the constituent reflectors. As a result, the time-frequency selective channel is converted into an invariant, separable and orthogonal interaction, where all received symbols experience the same localized impairment and all the delay-Doppler diversity branches are coherently combined.

This renders OFTS ideally suited for wireless communication between transmitters and receivers that move at high speeds with respect to each other, e.g., receivers or transmitters located in high-speed trains, cars and even aircrafts.

FIG. 1 shows a block diagram of a general OTFS transmission system. A transmitter 200 comprises a first transmitter-side transformation unit 202 and a second transmitter-side transformation unit 204. Serial binary data is input to a signal mapper (not shown in the figure) that outputs a two-dimensional sequence of information symbols x[k, l] in which the QAM symbols are arranged along the delay period and the Doppler period of the delay-Doppler domain. The information symbols comprise data symbols, pilot symbols and guard symbols surrounding the pilot symbols. The two-dimensional sequence of information symbols x[k, l] is input to the first transmitter-side transformation unit 202 and is subjected to an inverse Finite Symplectic Fourier Transformation (iSFFT), which produces a matrix X[n, m] that represents the two-dimensional sequence of information symbols x[k, l] in the time-frequency domain. As the transmitter transmits in the time domain, a further transformation in the second transmitter-side transformation unit 204 is required, which produces the signal s[t] in the time domain, e.g., a Heisenberg transformation. The signal s[t] is then transmitted via an antenna 206 over the communication channel.

In a realistic environment the transmitted signal, on its way from the transmitter through the communication channel to the receiver, is subject to doubly selective fading with Doppler spread. The received signal is a superposition of a direct copy and a plurality of reflected copies of the transmitted signal, where each copy is delayed by a path delay that is dependent from the length of the signal's path delay and is frequency shifted by the Doppler shift that depends from the differential speed between transmitter, reflector, and receiver. Each of the signal copies is weighted in accordance with its particular path delay and differential speed. Typical Doppler shifts are on the order of 10 Hz-1 kHz, though larger values may occur in scenarios with extremely high mobility (e.g., high-speed trains) and/or high carrier frequency. As in realistic environments it is very likely that multiple reflectors and/or moving reflectors are present, the received superimposed signal is spread out over a frequency range rather than merely shifted in frequency, and the signal deformation is thus also referred to as Doppler-spread. In the following description the realistic communication channel is also referred to as practical communication channel.

In FIG. 1 the practical communication channel is represented by the undisturbed radio waves emitted from the transmitter antenna 206 and the various unordered radio waves coming from different directions and with different distances to each other at the receiver antenna 302. The radio waves may arrive at the receiver's antenna directly or after being reflected one or several times at one or more stationary and/or moving objects, which may introduce Doppler shift and different delays to the reflected radio waves.

The receiver 300 picks up the received signal r[t] in the time domain, which is provided to a first receiver-side transformation unit 304, in which it is subjected to a Wigner transform for transforming the received signal r[t] into a matrix Y[n, m] representing the received signal r[t] in the time-frequency domain. For enabling signal detection in the delay-Doppler domain the matrix Y[n, m] is then provided to a second receiver-side transformation unit 306, where it is subjected to a Finite Symplectic Fourier Transformation (SFFT), which outputs a two-dimensional sequence of information symbols y[k, l] in the delay-Doppler domain. The two-dimensional sequence of information symbols y[k, l] is input to a channel estimation and equalisation block 310, which performs channel estimation CE and signal detection SD and reconstructs the symbols that were originally transmitted, and ultimately to a de-mapper that outputs the binary data that was originally transmitted (de-mapper not shown in the figure).

In order to enable channel estimation in the receiver, pilot signals, also referred to as pilots, may be added at the transmitter. These pilot signals, that are known beforehand at the receiver, are located at known positions within the two-dimensional sequence of information symbols that is ultimately transmitted. However, while allowing for a high channel estimation accuracy at low signal to noise ratios (SNR), the pilot signals taking the place of data symbols, but not carrying any data, reduce the spectral efficiency of the system. In known OTFS receivers using CE-BEM channel estimation the pilot overhead, in order to achieve acceptable performance, must be increased with increasing maximum channel delay and Doppler spread, further reducing the spectral efficiency. While many OTFS channels may have a known maximum channel delay and possibly also maximum known Doppler spread, real-life systems will be designed for even higher maximum delay and Doppler spread, for providing some safety margin. This will even further reduce the spectral efficiency in such practical systems.

An improvement of the spectral efficiency can be achieved by using superimposed pilots and using the freed-up space for data symbols. Superimposed pilots employ low-powered pilots that are superimposed on data symbols in the delay-Doppler domain. In addition to having a good spectral efficiency the superimposed pilot signals also provide a better tracking of time varying channels.

FIG. 2 shows an illustration of superimposed pilots. As is shown in the left part of FIG. 2, the pilots may be arranged across the entire plane of the two-dimensional sequence of information symbols that are arranged along the delay period and the Doppler period of the delay-Doppler domain, albeit at a much lower power. The pilots are represented by the ordered checkerboard pattern, indicating the fact that the pilots are known beforehand at the receiver. The data is represented by the random pattern, indicating the variable nature of the data that is transmitted. The power allocation is indicated by the distance from the delay-Doppler plane. The right part of FIG. 2 shows an exemplary power allocation to pilots and data symbols. It is easy to see that the pilots have a much lower power than the data.

The data symbols and the pilots superimposed thereon are transformed into the OTFS signal vector, that is ultimately transmitted after further transformations.

In the following discussion of the transmitted signal M and N represent the dimensions of the delay grid and the Doppler grid, respectively, in which the symbols are arranged. The transmitted complex OTFS vector x, which consists of both superimposed pilots and data symbols, is defined as $$x=[x[0,0],x[0,1],\ldots,x[0,M-1],\ldots,x[N-1,0],x[N-1,1],\ldots,x[N-1,M-1]]^T.$$

In realistic scenarios, there is a constraint for the transmission power which covers both data and pilot transmission, i.e., data symbols and pilots share the total transmission power available to the transmitter. The transmitted complex OTFS vector x can be represented as a superimposed pilot vector $x_{sp}$ and a data vector $x_d$, in the delay-Doppler domain, which are defined as $$x_{sp}=$$

$$[x_{sp}[0,0],x_{sp}[0,1],\ldots,x_{sp}[0,M-1],\ldots,x_{sp}[N-1,0],x_{sp}[N-1,1],\ldots,_{sp}[N-1,M-1]]^T,$$

and $$x_d=$$

$$[x_d[0,0],x_d[0,1],\ldots,x_d[0,M-1],\ldots,x_d[N-1,0],x_d[N-1,1],\ldots,x_d[N-1,M-1]]^T.$$

Define $P_T$ as the total transmission power and $\alpha(\alpha\in(0,1))$ as the pilot power allocation ratio. It suggests that $\alpha P_T$ and $(1-\alpha)P_T$ are used for transmitting pilots and data symbols, respectively. As a result, the transmitted OTFS signal vector x can be expressed as $$x=\sqrt{\alpha}\,x_{sp}+\sqrt{1-\alpha}\,x_d,$$

where α is the pilot power allocation ratio. Typically, if more power is used for pilot transmission, i.e., α is large, the channel estimation performance can be expected to be better. However, less power would remain for data transmission, giving rise to low data signal-to-noise-ratio (SNR) and thus low reliability. Instead, the pilots allocated with less power, i.e., α is small, would lead to a poor channel estimate and signal estimate. Therefore, a suitable power allocation between data and pilots is of utter importance in achieving high reliability.

OFTS presents its own challenges when it comes to channel estimation and equalization in a receiver. Channel estimation in wireless communications has been improved by introducing iterative processes that use detected data symbols as pseudo pilots.

For example, iterative channel estimation, signal detection, and data decoding for single-carrier systems has been investigated by H. Kim and J. K. Tugnait in "Turbo equalization for doubly-selective fading channels using nonlinear Kalman filtering and basis expansion models," IEEE Trans. Wireless Commun., vol. 9, no. 6, pp. 2076-2087, 2010 and by A. Movahedian and M. McGuire in "Estimation of fast-fading channels for Turbo receivers with high-order modulation," IEEE Trans. Veh. Technol., vol. 62, no. 2, pp. 667-678, 2013. However, such single-carrier methods are not applicable to OTFS.

Iterative OTFS receivers using superimposed pilot signals have been proposed by H. B. Mishra, P. Singh, A. K. Prasad, and R. Budhiraja in "OTFS channel estimation and data detection designs with superimposed pilots," IEEE Trans. Wireless Commun., vol. 21, no. 4, pp. 2258-2274, 2022, and in "Iterative channel estimation and data detection in OTFS using superimposed pilots," in Proc. IEEE Int. Conf. Commun. (ICC) Workshops 2021, Montreal, QC, Canada, 2021, pp. 1-6 by the same authors.

W. Yuan, S. Li, Z. Wei, J. Yuan, and D. W. K. Ng have discussed a similar idea in "Data-aided channel estimation for OTFS systems with a superimposed pilot and data transmission scheme," IEEE Wireless Commun. Lett., vol. 10, no. 9, pp. 19541958, 2021.

These previous works are, however, suitable for impractical Doppler-shift channel only, and cannot be used in practical communication channels subject to Doppler-spread.

Two basis expansion modelling (BEM) OTFS receivers for practical Doppler-spread channel have been proposed, by the inventors of the present invention, in "Near-optimal BEM OTFS receiver with low pilot overhead for high-mobility communications," IEEE Trans. Commun., vol. 70, no. 5, pp. 3392-3406, 2022 and "BEM OTFS receiver with superimposed pilots over channels with doppler and delay spread," in Proc. IEEE Int. Conf. Commun. (ICC), Seoul, South Korea, 2022, pp. 1-6.

However, channel coding, which is a very important component in any communication system, is not considered in the inventors' previous works. For instance, Turbo and convolutional coding have been adopted in the fourth generation (4G) long-term evolution (LTE) networks, while low-density parity-check (LDPC) and Polar coding have been utilized in the fifth generation (5G) new radio (NR) networks.

The real-life challenges associated with practical Doppler-spread channels have been addressed by H. Qu, G. Liu, L. Zhang, M. A. Imran, and S. Wen in "Low-dimensional subspace estimation of continuous Doppler-spread channel in OTFS systems," IEEE Trans. Commun., vol. 69, no. 7, pp. 4717-4731, 2021. In this work, a subspace-aided OTFS receiver has been developed which, however, requires a large number of dedicated pilot signals, resulting in low spectral efficiency.

While each of the solutions presented in the previous works discussed above has its benefit in specific, at times unrealistic settings, it remains desirable to provide an improved method of transmitting symbols over an OTFS communication channel subject to Doppler-spread that offers a high spectral efficiency, and an improved method of receiving symbols transmitted over an OTFS communication channel that provides fast and reliable channel estimation and equalisation in realistic settings.

SUMMARY OF THE INVENTION

A first aspect of the present invention targets to optimise the superimposed pilot power ratio α at the transmitter side. A second aspect of the present invention provides a method of iterative channel estimation, signal detection, and data decoding at the receiver side. Third and fourth aspects provide apparatus implementing the methods of the first and second aspects, respectively.

Prior to discussing the methods and apparatus implementing the methods in detail, the general system model of a coded OTFS system will be introduced.

FIG. 3 illustrates a block diagram of an exemplary coded OTFS system. Denote b as bit stream which is then encoded by channel encoder 302 with code rate of R, yielding the coded bit stream $b_c$. $b_c$ is first interleaved in interleaver 304 and then mapped, in signal mapper 306, to data symbols as $x_d$ using phase shift keying (PSK) or quadrature amplitude modulation (QAM) modulation. Superimposed pilots $x_{sp}$ are adopted and added on top of every data symbol in pilot signal adding unit 308. $x_d$ and $x_{sp}$ are column vectors of length MN, where M and N are the number of OTFS delay and Doppler grids/bins, respectively. Define $\alpha(\alpha\in[0,1])$ as superimposed pilot power ratio. The transmitted OTFS signal in delay-Doppler domain is given by $$x=\sqrt{\alpha}\,x_{sp}+\sqrt{1-\alpha}\,x_d$$

After passing through OTFS modulator 310, signal is transmitted via the doubly-selective fading channel with Doppler spread, and the received signal is input to OTFS demodulator 404. The demodulated signal is provided to a channel estimator 406, whose output is used in signal detector 408 for detecting the transmitted symbols. The detected symbols are input to signal de-mapper 410, whose output is provided to deinterleaver 412. The deinterleaved symbols are provided to channel decoder 414, which then outputs the transmitted binary sequence b.

The received OTFS signal y in the delay-Doppler domain that is output by the demodulator 404 is expressed as $$y=(F_N\otimes I_M)H_t(F_N^H\otimes I_M)\left(\sqrt{\alpha}\,x_{sp}+\sqrt{1-\alpha}\,x_d\right)+w$$

where $F_N$ is the N-point discrete Fourier transform (DFT) matrix, $I_M$ the M×M identity matrix, w the additive white Gaussian noise (AWGN) vector of noise variance $$\sigma_w^2,$$

and $H_t$ the MN×MN time varying channel matrix in the time domain defined as, $$H_i = \begin{bmatrix} h[0,0] & 0 & \cdots & 0 & h[0,L] & h[0,L-1] & \cdots & h[0,1] \\ h[1,1] & h[1,0] & 0 & \cdots & 0 & h[1,L] & \cdots & h[1,2] \\ \vdots & \ddots & \ddots & \ddots & \ddots & \ddots & \ddots & \vdots \\ h[L,L] & h[L,L-1] & \cdots & h[L,1] & h[L,0] & 0 & \cdots & 0 \\ \vdots & \ddots & \ddots & & \ddots & \ddots & & \vdots \\ 0 & \cdots & 0 & h[MN-1,L] & h[MN-1,L-1] & \cdots & h[MN-1,L] & h[MN-1,0] \end{bmatrix}$$

with h[t, l] denoting the channel gain of the l-th path at the t-th time instant, t=0, 1, . . . , MN-1, and l=0, 1, . . . , L. L denotes the channel length.

Define $$f_{max} = \frac{f_c v}{c}$$

as the maximum Doppler frequency, where $f_c$ is the carrier frequency, v the vehicle speed, and c the speed of light. Considering Jakes' model with U-shaped Doppler spectrum, the correlation function of the l-th path is defined as $J_0(2\pi n f_{max} T_s)$, where $J_0(\cdot)$ denotes the zeroth-order Bessel function of the first kind, and $T_s$ the sampling period.

By utilizing basis expansion modelling (BEM) to model $H_t$, y is formulated as $$y = \sum_{q=0}^{Q} (F_N \otimes I_M)\,\mathrm{diag}\,\{b_q\} F_{MN}^H\,\mathrm{diag}\,\{F_{MN\times L} c_q\} F_{MN}\left(F_N^H \otimes I_M\right)\left(\sqrt{\alpha}\,x_{sp} + \sqrt{1-\alpha}\,x_d\right) + w + z$$

where Q is the BEM order, i.e., the number of BEM basis functions, $b_q$ and $c_q$ are defined as the q-th BEM basis function and its corresponding BEM coefficient, $F_{MN}$ is the MN-point DFT matrix, $F_{MN\times L}$ corresponds to the first (L+1) columns of $F_{MN}$, and z is the error to the received signal caused by BEM modelling.

As discussed by the present inventors in "Near-optimal BEM OTFS receiver with low pilot overhead for high-mobility communications," IEEE Trans. Commun., vol. 70, no. 5, pp. 3392-3406, 2022, the modelling error can be considered as AWGN with zero mean and variance of $$\sigma_z^2.$$

The foregoing equation is also equivalent to $$y = \sqrt{\alpha}\underbrace{\sum_{q=0}^{Q} (F_N \otimes I_M)\mathrm{diag}\,\{b_q\} F_{MN}^H \mathrm{diag}\left\{F_{MN}\left(F_N^H \otimes I_M\right)x_{sp}\right\} F_{MN\times L} c_q}_{A_{sp,q}} + \sqrt{1-\alpha}\underbrace{\sum_{q=0}^{Q} (F_N \otimes I_M)\mathrm{diag}\,\{b_q\} F_{MN}^H \mathrm{diag}\left\{F_{MN}\left(F_N^H \otimes I_M\right)x_d\right\} F_{MN\times L} c_q c_q}_{A_{d,a}} + w + z.$$

It is to be noted that different shapes for the Doppler spectrum may be considered, depending on the environment. A selection of exemplary Doppler spectra is shown in FIGS. 18 to 23. FIG. 18 shows the basic shape of Jakes' U-shaped Doppler spectrum that may be assumed, e.g., when considering outdoor environments with fixed reflectors. FIG. 19 shows the basic shape of an asymmetric Jakes Doppler spectrum that may be assumed, e.g., in general outdoor environments. FIG. 20 shows a Gaussian Doppler spectrum, which may be assumed, e.g., in indoor or outdoor environments with moving hand-held reception. FIG. 21 shows a rounded Doppler spectrum that may be assumed, e.g., in indoor or outdoor environments with fixed stations and moving reflectors. FIG. 22 shows a flat Doppler spectrum that may be assumed, e.g., in an indoor environment with fixed reflectors, and FIG. shows a bell-shaped Doppler spectrum that may be assumed, e.g., in general indoor environments. For comparison, FIG. 24 shows an exemplary representation of a pure integer Doppler shift, which is often assumed in OTFS considerations for sake of simplicity at the cost of missing out on the conditions found in real environments.

To give a more tangible example, FIG. 25 a) shows a realistic Doppler spectrum for two vehicles moving in the same direction. The Doppler spectrum is rather similar to the bell-shaped Doppler spectrum shown in FIG. 23. FIG. 25 b) shows a realistic Doppler spectrum for two vehicles moving in opposite direction. Here, the Doppler spectrum is rather similar to the asymmetric U-shaped Jakes' Doppler spectrum shown in FIG. 19.

It is further to be noted that the BEM order Q required for satisfying communication performance likewise varies with the Doppler spectrum type assumed for a respective environment. FIG. 26 shows an exemplary graph representing this relation. The bar labelled (i) represents the BEM order for the pure integer Doppler shift shown in FIG. 24, while the bar labelled (ii) represents the BEM order for Jakes', asymmetric Jakes', bell-shaped, flat, rounded, and fractional Doppler shift, and the bar labelled (iii) represents the BEM order for Gaussian Doppler shift. It is to be noted that the length of the bars is not to scale; the equations next to the respective bar provide more accurate respective magnitudes.

The value of the BEM order Q has a notable effect on the optimal superimposed pilot power ratio α requiring corresponding optimisation. FIG. 27 shows a representation of the influence of an assumed Doppler spectrum on the superimposed pilot power ratio α. The graph shows the SNR over the superimposed pilot power ratio α for three scenarios:

1) assuming an integer Doppler shift, represented by the circles,
2) assuming a Doppler spread having a Jakes, asymmetric Jakes, bell-shaped, flat, or rounded shape or having a fractional Doppler shift shape,
3) assuming a Doppler spread having a Gaussian shape.

It is readily apparent that the respective optimal value of the superimposed pilot power ratio α, i.e., the one that results in the best SNR, is different depending on the scenario.

The table below shows the impact of further parameters, here: M, N, L, Q, $\sigma^2$ on the superimposed pilot power ratio α*. A change of the value of a respective system parameter in the direction of the arrow will result in a change of the optimal superimposed pilot power ratio α* in the direction indicated by the arrow in the same column. Changes of the system parameter values the opposite direction will result in a change of the optimal superimposed pilot power ratio $\alpha^*$ in the opposite direction.

| System parameter | M↗ | N↗ | Q↗ | L↗ | $\sigma^2$↘ |
|---|---|---|---|---|---|
| $\alpha^*$ | ↘ | ↘ | ↗ | ↗ | ↗ |

Thus, in accordance with a first aspect of the present invention, a method of transmitting a binary data sequence over an OTFS communication channel subject to Doppler-spread is presented. Inter alia, the method comprises optimising the superimposed pilot power ratio. In order to avoid the need for end-to-end simulations or trials, which are computationally expensive, introduce unwanted latency and/or use channel resources and thus reduce the spectral efficiency of the communication system, an aspect of the present invention notably proposes a method of optimising the superimposed pilot power ratio solely based on information that is readily available at the transmitter.

As mentioned before, the transmitted OTFS signal in delay-Doppler domain is given by $$x = \sqrt{\alpha}\, x_{sp} + \sqrt{1-\alpha}\, x_d$$

The data signals and superimposed pilots in the OTFS system are arranged in matrices $A_d$ and $A_{sp}$, respectively. Defining $A_{sp}=[A_{sp,0}, A_{sp,1}, \ldots, A_{sp,Q}]$, $A_d=[A_{d,0}, A_{d,1}, \ldots, A_{d,Q}]$ and $$c = \left[c_0^T, c_1^T, \ldots, c_Q^T\right]^T$$

the previous equation for y can be further written as $$y = \sqrt{\alpha}\, A_{sp} c + \underbrace{\sqrt{1-\alpha}\, A_d c + w + z}_{Interference+Noise+Modeling\ error}.$$

By treating the data as interference, an initial channel estimate $\hat{c}^0$ can be obtained by utilizing superimposed pilot matrix $A_{sp}$. Hence, the received data signal is given by $$y_d = y - \sqrt{\alpha}\, A_{sp}\hat{c}^0$$

-continued $$\begin{aligned}
&= \sqrt{\alpha}\, A_{sp} c + \sqrt{1-\alpha}\, A_d c + w + z - \sqrt{\alpha}\, A_{sp}\hat{c}^0 \\
&= \sqrt{\alpha}\, A_{sp}(c - \hat{c}^0) + \sqrt{1-\alpha}\, A_d(c - \hat{c}^0) + \sqrt{1-\alpha}\, A_d\hat{c}^0 + w + z \\
&= \underbrace{\sqrt{1-\alpha}\, A_d\hat{c}^0}_{Desired\ signal} + \underbrace{\underbrace{\left(\sqrt{\alpha}\, A_{sp} + \sqrt{1-\alpha}\, A_d\right)}_{A}(c - \hat{c}^0) + w + z}_{Estimation\ error+noise+Modelling\ error}.
\end{aligned}$$

The SINR is thus defined as $$SINR(\alpha) = \frac{\mathbb{E}\{(1-\alpha)(\hat{c}^0)^H A_d^H A_d \hat{c}^0\}}{\mathbb{E}\{(c-\hat{c}^0)^H A^H A (c-\hat{c}^0) + w^H w + z^H z\}}$$

Denote $SINR_N$ and $SINR_D$ as the numerator and denominator of the previous equation, respectively.

$SINR_N$ is given by $$\begin{aligned}
SINR_N &= \mathbb{E}\{\text{Trace}\ \{((1-\alpha)A_d^H A_d \hat{c}^0(\hat{c}^0)^H\}\} \\
&= \mathbb{E}\{\text{Trace}\ \{(1-\alpha)A_d^H A_d(\hat{c}^0(\hat{c}^0)^H + cc^H)\}\} \\
&= \text{Trace}\ \{(1-\alpha)\mathbb{E}\{A_d^H A_d(\hat{c}^0(\hat{c}^0)^H + cc^H)\}\} \\
&= \text{Trace}\ \left\{(1-\alpha)\left\{\mathbb{E}\left\{A_d^H A_d\left((A_{sp}^H A_{sp})^{-1}\frac{\sigma_w^2 + \sigma_z^2 + 1 - \alpha}{\alpha} + cc^H\right)\right\}\right\}\right\} \\
&= (1-\alpha)\underbrace{\text{Trace}\ \{\mathbb{E}\{A_d^H A_d(A_{sp}^H A_{sp})^{-1}\}\}}_{q}\frac{\sigma_w^2 + \sigma_z^2 + 1 - \alpha}{\alpha} + (1-\alpha)\text{Trace}\ \{\mathbb{E}\{A_d^H A_d cc^H\}\} \\
&= \frac{(1-\alpha)q(\sigma_w^2 + \sigma_z^2 + 1 - \alpha)}{\alpha} + \{1-\alpha\}\text{Trace}\ \{\mathbb{E}\{A_d^H A_d cc^H\}\}.
\end{aligned}$$

Define h as time-varying channel impulse response vector of length MN(L+1). The true BEM coefficient c is thus given by c=Dh, with $D=(B \otimes I_{L+1})^\dagger$ and the BEM basis functions $B=[b_0, b_1, \ldots, b_Q]$. Hence, Trace $$\{\mathbb{E}\{A_d^H A_d cc^H\}\}$$

is further expressed as $$\begin{aligned}
\text{Trace}\{\mathbb{E}\{A_d^H A_d cc^H\}\} &= \text{Trace}\{\mathbb{E}\{A_d^H A_d Dhh^H Dh^H\}\} \\
&= \text{Trace}\{\mathbb{E}\{D^H A_d^H A_d Dhh^H\}\} \\
&= \text{Trace}\{\mathbb{E}\{D^H A_d^H A_d Dhh^H\}\} \\
&= \text{Trace}\{\mathbb{E}\{D^H A_d^H A_d\}\mathbb{E}\{hh^H\}\} \\
&= \text{Trace}\{\mathbb{E}\{D^H A_d^H A_d D\}R_{hh}\} \\
&= \text{Trace}\{\mathbb{E}\{A_d^H A_d\}DR_{hh}D^H\}\} \\
&\approx \text{Trace}\{R_{hh}\}
\end{aligned}$$

Denoting p=Trace$\{R_{hh}\}$, $SINR_N$ is finally expressed as $$SINR_N = \frac{(1-\alpha)\left[q(\sigma_w^2 + \sigma_z^2 + 1 - \alpha) + p\alpha\right]}{\alpha}$$

$\text{SINR}_D$ is given by $$\text{SINR}_D = \mathbb{E}\{\text{Trace}\{A^H A(c-\hat{c}^0)(c-\hat{c}^0)^H\}\} + MN(\sigma_w^2+\sigma_z^2)$$

According to the work of the present inventors in "Near-optimal BEM OTFS receiver with low pilot overhead for high-mobility communications," IEEE Trans. Commun., vol. 70, no. 5, pp. 3392-3406, 2022, the BEM coefficient estimation error by using superimposed pilots can be given by $$\begin{aligned}\hat{c}^0(\hat{c}^0)^H &= (c-\hat{c}^0)(c-\hat{c}^0)^H \\ &= \left(A_{sp}^H A_{sp}\right)^{-1}\frac{\sigma_w^2+\sigma_z^2+1-\alpha}{\alpha}\cdot\end{aligned}$$

Hence, $\text{SINR}_D$ can be further expressed as $$SINR_D = \underbrace{\mathbb{E}\left\{\text{Trace}\left\{A^H A\left(A_{sp}^H A_{sp}\right)^{-1}\frac{\sigma_w^2+\sigma_z^2+1-\alpha}{\alpha}\right\}\right\}}_{K} + MN(\sigma_w^2+\sigma_z^2).$$

K is calculated by $$\begin{aligned}K &= \mathbb{E}\left\{\text{Trace}\left\{\left(\alpha A_{sp}^H A_{sp} + (1-\alpha)A_d^H A_d\right)\left(A_{sp}^H A_{sp}\right)^{-1}\frac{\sigma_w^2+\sigma_z^2+1-\alpha}{\alpha}\right\}\right\} \\ &= \mathbb{E}\left\{\text{Trace}\left\{(1-\alpha)A_d^H A_d\left(A_{sp}^H A_{sp}\right)^{-1}\frac{\sigma_w^2+\sigma_z^2+1-\alpha}{\alpha}\right\}\right\} + \\ &\quad (L+1)(Q+1)\alpha\frac{\sigma_w^2+\sigma_z^2+1-\alpha}{\alpha} \\ &= \frac{(1-a)(\sigma_w^2+\sigma_z^2+1-a)}{a}\text{Trace}\left\{\mathbb{E}\left\{A_d^H A_d\left(A_{sp}^H A_{sp}\right)^{-1}\right\}\right\} + \\ &\quad (L+1)(Q+1)(\sigma_w^2+\sigma_z^2+1-\alpha) \\ &= \frac{(1-\alpha)(\sigma_w^2+\sigma_z^2+1-\alpha)q + (L+1)(Q+1)(\sigma_w^2+\sigma_z^2+1-\alpha)\alpha}{\alpha} \\ &\text{where } q = \text{Trace}\left\{\mathbb{E}\left\{A_d^H A_d\left(A_{sp}^H A_{sp}\right)^{-1}\right\}\right\}.\end{aligned}$$

$\text{SINR}_D$ is then finally expressed as $$\begin{aligned}SINR_D &= \frac{\begin{array}{c}(1-\alpha)(\sigma_w^2+\sigma_z^2+1-\alpha)q + \\ (L+1)(Q+1)(\sigma_w^2+\sigma_z^2+1-\alpha)\alpha + MN\alpha(\sigma_w^2+\sigma_z^2)\end{array}}{\alpha} \\ &= \frac{(\sigma_w^2+\sigma_z^2+1-\alpha)((1-\alpha)q+\alpha(L+1)(Q+1)) + MN\alpha(\sigma_w^2+\sigma_z^2)}{\alpha}\end{aligned}$$

Hence, the SINR is given by $$\begin{aligned}SINR(\alpha) &= \frac{(1-\alpha)\left[q(\sigma_w^2+\sigma_z^2+1-\alpha)+p\alpha\right]}{\begin{array}{c}(\sigma_w^2+\sigma_z^2+1-\alpha)((1-\alpha)q+\alpha(L+1)(Q+1)) + \\ MN\alpha(\sigma_w^2+\sigma_z^2)\alpha\end{array}} \\ &= \frac{(q-p)\alpha^2 + (p-2q-q(\sigma_w^2+\sigma_z^2))\alpha + q(\sigma_w^2+\sigma_z^2+1)}{\begin{array}{c}(\sigma_w^2+\sigma_z^2+1-\alpha)((1-\alpha)q+\alpha(L+1)(Q+1)) + \\ MN\alpha(\sigma_w^2+\sigma_z^2)\end{array}}\end{aligned}$$

Assuming full rank of $$A_d^H A_d \text{ and } A_{sp}^H A_{sp}$$

is achieved by using proper BEM modeling, q can be approximated as the full rank of $$\mathbb{E}\left\{A_d^H A_d\left(A_{sp}^H A_{sp}\right)^{-1}\right\}$$

and denoted as (L+1)(Q+1).

The so-derived SINR is a function of the channel correlation matrix in the time domain $R_{hh}$ and can be used with different types of channel models, including the practical Doppler-spread channel discussed by the present inventors in "Near-optimal BEM OTFS receiver with low pilot overhead for high-mobility communications," IEEE Trans. Commun., vol. 70, no. 5, pp. 3392-3406, 2022 and in "BEM OTFS receiver with superimposed pilots over channels with doppler and delay spread," Proc. IEEE Int. Conf. Commun. (ICC), Seoul, South Korea, 2022, pp. 1-6, and likewise discussed by H. Qu, G. Liu, L. Zhang, M. A. Imran, and S. Wen in "Low-dimensional subspace estimation of continuous Doppler-spread channel in OTFS systems," IEEE Trans. Commun., vol. 69, no. 7, pp. 4717-4731, 2021, and further including the impractical Doppler-shift channel discussed by H. B. Mishra, P. Singh, A. K. Prasad, and R. Budhiraja in "OTFS channel estimation and data detection designs with superimposed pilots," IEEE Trans. Wireless Commun., vol. 21, no. 4, pp. 2258-2274, 2022, and in "Iterative channel estimation and data detection in OTFS using superimposed pilots," Proc. IEEE Int. Conf. Commun. (ICC) Workshops 2021, Montreal, QC, Canada, 2021, pp. 1-6, as well as by W. Yuan, S. Li, Z. Wei, J. Yuan, and D. W. K. Ng in "Data-aided channel estimation for OTFS systems with a superimposed pilot and data transmission scheme," IEEE Wireless Commun. Lett., vol. 10, no. 9, pp. 19541958, 2021. In contrast to the approach presented above the SINR derivation in existing works, e.g., presented by H. B. Mishra, P. Singh, A. K. Prasad, and R. Budhiraja in "OTFS channel estimation and data detection designs with superimposed pilots," IEEE Trans. Wireless Commun., vol. 21, no. 4, pp. 2258-2274, 2022, is limited to impractical Doppler-shift channels.

The channel correlation matrix in the time domain $R_{hh}$ for one channel path may be obtained by using history channel estimates, which may be available at the transmitter, e.g., a base station (BS) and/or at the respective user equipment (UE). This is possible, inter alia, because, compared to the channel impulse response vector $\hat{h}_j$ of length MN for j-th frame, $R_{hh}$ or the second-order statistics of the channel, changes more slowly over time than the channel itself.

An exemplary block diagram of the inputs and calculation is shown in FIG. 28, where the average over a predetermined number of previous 'historical' channel correlation matrices is determined for the j-th frame. The number of historical channel correlation matrices, which form a sliding window, may be variable and may be changed dynamically depending on requirements, e.g., in case the channel experiences a sudden significant change due to some external reasons. Of course, other methods for determining $R_{hh}$ may also be used.

Also shown in FIG. 28 is the use of the priori knowledge of the second-order statistics of channel for resource allocation, channel estimation enhancement, etc., here represented by its use for determining the BEM order Q.

The superimposed pilot power ratio $\alpha$ can be optimized by maximizing the SINR using the previously determined equation, i.e., $$\alpha^* = \max_{\alpha} SINR(\alpha).$$

The optimal $\alpha^*$ is obtained by solving the following function, i.e., $$\frac{dSINR(a)}{d\alpha} = 0$$

where $\frac{dSINR(a)}{d\alpha}$ denotes the first derivative of SINR($\alpha$) with respect to $\alpha$.

Hence, the optimal superimposed pilot power ratio $\alpha^*$ can be determined at the transmitter side, which greatly saves resources, e.g., time, bandwidth, power, computations, etc., for end-to-end trials or simulations.

FIG. 4 shows a diagrammatic representation of the inputs to and output of the pilot signal adding unit 308 that performs the method of optimizing the pilot power ratio optimization at the transmitter side in accordance with the first aspect of the present invention. Information about the OTFS system parameters, i.e., the number of delay grids M, the number of Doppler grids N, the carrier frequency $f_c$ and the subcarrier spacing $\Delta f$, and about the channel are required, i.e., the channel correlation matrix $R_{hh}$, the channel length L, the BEM order Q, and the Gaussian noise variance $\sigma^2$. L and Q relate to the relative velocity v between the transmitter and receiver, $f_c$ and $\Delta f$. At least some of the information items are also required for channel estimation, and in most cases are available to the transmitter from a receiver co-located with the transmitter for bi-directional communication. As can be seen from the derivation of the SINR presented further above, the derived SINR is approximated and unrelated with pilot and data symbols. Thus, information about random pilot and data symbols, which is processed in the pilot signal adding unit 308 of the transmitter anyway, is optional for optimising the superimposed pilot power ratio. Nevertheless, using information about the pilot and data symbols information can help providing a more accurate SINR.

Generally, if there are no significant changes in the channel correlation (Doppler spectrum), channel length, velocity, and noise variance, there is no need to re-optimize $\alpha$.

Thus, in accordance with the first aspect of the present invention, a method of transmitting a binary data sequence over an OTFS communication channel subject to Doppler-spread, as exemplarily shown in FIG. 5, comprises receiving, in step 102, a binary data sequence b to be transmitted, a step 104 of encoding the binary data sequence b in a channel encoder, yielding a coded bit stream $b_e$, and mapping, in step 108, the binary data sequence b to data symbols $x_d$. In step 118 pilot signals $x_{sp}$ are superimposed onto the data signals $x_d$, yielding a transmit signal x, which is OTFS-modulated in step 120 and transmitted, in step 122, over the OTFS communication channel. Prior to the superimposing step 118 the method comprises receiving, in step 110, information about OTFS system parameters, including one or more of a number of delay grids M, a number of Doppler grids N, a carrier frequency $f_c$, and a subcarrier spacing $\Delta f$. Further, in step 112, information about the OTFS communication channel, including one or more of channel correlation matrix $R_{hh}$, the channel length L, the BEM order Q, and the Gaussian noise variance $\sigma^2$ are received. The information received in steps 110 and 112 is used, in step 114, for determining a pilot signal power ratio $\alpha^*$ to be used for superimposing in step 118, the determination being based solely on the received system parameters and the received channel information as input. Determining the superimposed pilot power ratio comprises, in particular, maximizing the SINR expressed as being dependent solely from the received system parameters and the received channel information. The so-determined pilot signal power ratio $\alpha^*$ is provided to the superimposing step 118.

Steps 110 to 116 may be executed conditionally, e.g., only when changes in the information items pertaining to the channel information exceed respective predetermined values.

The channel encoder may be configured for outputting a forward error corrected bit stream, e.g., in accordance with Turbo coding or low-density parity check (LDPC) coding.

In one or more embodiments the method further comprises, prior to mapping the binary data sequence b to data symbols $x_d$ in step 108, a step 106 of interleaving the binary data sequence b or the coded bit stream $b_c$.

In one or more embodiments of the method receiving OTFS channel information in step 112 comprises performing a channel estimation on a signal received by a receiver 400 co-located with a transmitter 300 executing the method 100, for determining one or more of the OTFS channel information items and/or determining the channel's SINR.

The optimisation of the superimposed pilot power ratio used for transmitting, as described hereinbefore, enables achieving fast convergence speed in a receiver in accordance with a third aspect of the invention as described further below.

In accordance with a second aspect of the invention a method of receiving a binary data sequence transmitted over an OTFS communication channel subject to Doppler-spread is presented. The method comprises an iterative channel estimation, signal detection, and data decoding, executed in a two-staged manner.

In a first, initial stage, after demodulating the received OTFS signal (step 202), the channel is estimated (step 204) using solely the pilot signals, e.g., the superimposed pilots whose power ratio has been optimized in accordance with the first aspect of the invention. In case of superimposed pilot signals, the data symbols are treated as interference in the initial stage.

Further in the initial stage, a signal detection is performed (step 206) on the demodulated signal, using the results of the initial channel estimation. The demodulated signal is then subjected to de-mapping (step 208), yielding an initial received binary data sequence, from which the binary data is reconstructed (step 212) using the forward error correction added to the binary data sequence at the transmitter. The reconstruction, which may comprise appropriate channel decoding, yields an initial reconstructed binary data set.

Next, values related to probabilities or likelihoods indicating to which extent the reconstructed binary data correctly corresponds to respective signals mapped in the transmitter are determined for the reconstructed binary data set (step 214). These values related to probabilities or likelihoods include, e.g., log likelihood ratios (LLR), mean and corresponding variance of the reconstructed data symbols, or the like. This determination step marks the beginning of a second, iterative stage.

As long as a termination criterion is not met ("no"-branch of step 216), the reconstructed binary data and/or the associated values related to probabilities or likelihoods are fed back (step 220) to the de-mapping step (step 208'), and a receiver-side mapping of the reconstructed binary data and/or the associated values related to probabilities or likelihoods in accordance with a mapping applied to the data at the transmitter-side is performed (step 222), and the receiver-side mapped data is provided to the signal detecting step (step 206') and the channel estimation step (step 204'). The fed back information is used as additional input to the respective method steps, which are iteratively repeated until the termination criterion is met.

When the termination criterion is met ("yes"-branch of step 216), the reconstructed binary data set is output (step 224). Termination criteria comprise, inter alia, a predetermined number of iterations, one or more values related to probabilities or likelihoods exceeding respective predetermined values, and/or the difference between one or more values related to probabilities or likelihoods determined in two subsequent iterations differing less than respective predetermined values.

In one or more embodiments a posteriori LLRs determined based on the data output by the channel decoder are fed back to reconstruct a posteriori mean and variance of data symbols, which is then used for refining the channel estimation and signal detection. The respective extrinsic LLRs from the channel decoder are used as a priori LLR input to the de-mapper in the corresponding iterations.

In one or more embodiments of the method a de-interleaving step (step 210, step 210') may be provided between the de-mapping step (step 208, step 208') and the reconstructing step (step 212, step 212'). In this case a corresponding interleaving step (step 218') is provided prior to feeding back (step 220) the reconstructed binary data and/or the associated values related to probabilities or likelihoods to the de-mapping step (step 208'), and to performing (step 222) the receiver-side mapping of the reconstructed binary data and/or the associated values related to probabilities or likelihoods.

An exemplary flow diagram of the various steps of the method of receiving a binary data sequence with transmitter-side added forward error correction and pilot signals transmitted over an OTFS communication channel subject to Doppler-spread is shown in FIG. 6, the various steps are indicated in parentheses in the foregoing description. The dotted lines indicate the initial demodulated signal that is provided to the iteration stage. Dashed lines indicate optional steps.

In the following section, examples for the channel estimation, the signal detection, the de-mapping, and the mapping, respectively, are described in greater detail.

1 Channel Estimation:

Both initial and iterative channel estimation are described, respectively, by utilizing superimposed pilots and fed-back mean of data estimates reconstructed from a posteriori LLRs of channel decoder.

1.1 Initial Channel Estimation:

By applying the optimized power ratio $\alpha^*$ to the superimposed pilots and treating data as interference, the received OTFS signal is expressed as $$y = \sqrt{\alpha^*}\, A_{sp}\, c + \underbrace{\sqrt{1-\alpha^*}\, A_d c + w + z}_{\text{Interference + Noise + Modeling error}}.$$

Hence, the BEM coefficient c can be initially estimated by using superimposed pilots, $$\hat{c}^0 = \frac{A_{sp}^{\dagger} y}{\sqrt{\alpha^*}}$$

Note that the superscript $^0$ indicates that this is the initial channel estimation.

1.2 Iterative Channel Estimation:

In addition to the superimposed pilots, the a priori information, i.e., α priori mean of data symbols $$m_{pri}^i,$$

from the channel decoding and mapping is fed back to refine the channel estimation. To avoid noise enhancement, the power of $$m_{pri}^i$$

is normalized with respect to the power assigned to the data symbols for the PSK modulation. For QAM modulation, the power of $$m_{pri}^i$$

is normalized to the power of the symbol $\lambda_h$ from the QAM modulation alphabet $\mathbb{K}_{QAM}$, whose symbol probability $$P_{pos,x_d[n]=\chi_h}^i$$

is highest among all candidates in the QAM modulation alphabet.

Define the normalized mean of the data symbol estimate as $$\overline{m}_{pri}^i.$$

According to the definitions of $A_{sp}$, $A_d$, and c provided further above $$\hat{A}_{d,q}^i$$

can be formulated as $$\hat{A}_{d,q}^i = (F_N \otimes I_M)\, \mathrm{diag}\,\{b_q\} F_{MN}^H \mathrm{diag}\{F_{MN}(F_N^H \otimes I_M)\, \overline{m}_{pri}^i\} F_{MN\times L}$$

and thus, $$\hat{A}_d^i$$

is obtained as $$\hat{A}_d^i = [\hat{A}_{d,0}^i, \hat{A}_{d,1}^i, \ldots, \hat{A}_{d,Q}^i].$$

Therefore, the BEM coefficient c can be refined as $$\hat{c}^i = (\sqrt{\alpha^*} A_{sp} + \sqrt{1-\alpha^*} \hat{A}_d^i)^\dagger y.$$

2 Signal Detection:

With the BEM coefficient estimate $\hat{c}^i$, the received data signal is then calculated by $$\begin{aligned}\hat{y}_d^i &= y - \sqrt{\alpha^\star} A_{sp}\hat{c}^i \\ &= \sqrt{1-\alpha^\star} A_d c + \underbrace{\sqrt{\alpha^\star} A_{sp}(c - \hat{c}^i)}_{e^i} + w + z,\end{aligned}$$

where $e^i$ is the error due to the channel estimation and can be regarded as a Gaussian random vector with zero mean and variance of $$\sigma_{e,i}^2, \sigma_{e,i}^2$$

is expressed as $$\begin{aligned}\sigma_{e,i}^2 &= \frac{\text{Trace}\{\alpha^* A_{sp}(c-\hat{c}^i)(c-\hat{c}^i)^H A_{sp}^H\}}{MN} \\ &= \frac{\text{Trace}\{\alpha^* A_{sp}^H A_{sp}(c-\hat{c}^i)(c-\hat{c}^i)^H\}}{MN}\end{aligned}$$

As shown by the current inventors in "Near-optimal BEM OTFS receiver with low pilot overhead for high-mobility communications," IEEE Trans. Commun., vol. 70, no. 5, pp. 3392-3406, 2022, $(c-\hat{c}^i)(c-\hat{c}^i)^H$ is given by $$(c-\hat{c}^i)(c-\hat{c}^i)^H = \begin{cases} (A_{sp}^H A_{sp})^{-1} \frac{\sigma_w^2+\sigma_z^2+1-\alpha}{\alpha} & i = 0 \\ \left((\sqrt{\alpha^\star} A_{sp} + \sqrt{1-\alpha^\star} \hat{A}_d^i)^H (\sqrt{\alpha^\star} A_{sp} + \sqrt{1-\alpha^\star} \hat{A}_d^i)\right)^{-1} & i \ge 1 \end{cases}$$

For i=0, $$\sigma_{e,i}^2$$

is further given by $$\begin{aligned}\sigma_{e,0}^2 &= \frac{\text{Trace}\left\{\alpha^\star A_{sp}^H A_{sp}(A_{sp}^H A_{sp})^{-1} \frac{\sigma_w^2+\sigma_z^2+1-\alpha}{\alpha}\right\}}{MN} \\ &= \frac{(L+1)(Q+1)(\sigma_w^2+\sigma_z^2+1-\alpha^\star)}{MN}.\end{aligned}$$

For i≥1, $$\sigma_{e,i}^2$$

is expressed as $$\sigma_{e,i}^2 = \frac{\text{Trace}\left\{\alpha^\star A_{sp}\left((\sqrt{\alpha^\star} A_{sp} + \sqrt{1-\alpha^\star} \hat{A}_d^i)^H (\sqrt{\alpha^\star} A_{sp} + \sqrt{1-\alpha^\star} \hat{A}_d^i)\right)^{-1} (\sigma_w^2+\sigma_z^2) A_{sp}^H\right\}}{MN}.$$

Setting the right-hand side of the previous equation to β, $$\sigma_{e,i}^2$$

can be expressed as $$\sigma_{e,i}^2 = \begin{cases} \frac{(L+1)(Q+1)(\sigma_w^2+\sigma_z^2+1-\alpha^*)}{MN} & i = 0 \\ \beta & i \ge 1 \end{cases}.$$

Note that, assuming $$\hat{A}_d^i$$

approximates its true value $A_d$, β is close to zero. As defined further above, $A_d C$ is equivalent to $Dx_d$. Hence, $$\hat{y}_d^i$$

can be considered a Gaussian random variable with mean of $\sqrt{1-\alpha^* D x_d}$ and variance of $$\sigma^2 = (\sigma_e^2 + \sigma_w^2 + \sigma_z^2), \text{ i.e., } \hat{y}_d^i = \sqrt{1-\alpha^*} D x_d + e + w + z.$$

With the BEM coefficient estimate ci, an estimate of D is given by $$\hat{D} = \sum_{q=0}^{Q} (F_N \otimes I_M) \operatorname{diag}\{b_q\} F_{MN}^H \operatorname{diag}\{F_{MN\times L}\hat{c}_q^i\} F_{MN}(F_N^H \otimes I_M)$$

By letting $G=\sqrt{1-\alpha}*\hat{D}$, the initial a posteriori mean and variance of data $x_d$ are given by $$V_{pos}^i \left(G^H(\sigma^2)^{-1}G + \operatorname{diag}\{v_{pri}^{i-1}\}^{-1}\right)^{-1}$$

$$m_{pos}^i = V_{pos}^i \left(G^H(\sigma^2)^{-1}\hat{y}_d^i + \operatorname{diag}\{v_{pri}^{i-1}\}^{-1} m_{pri}^{i-1}\right),$$

where $v_{pri}^{i-1}$ and $m_{pri}^{i-1}$ are the a priori mean and variance of data symbols, which are obtained by using a posteriori LLRs of the channel decoder. The technical details can be found further down in this section. The extrinsic mean and variance of the $n^{th}$ (n=0, 1, . . . , MN−1) data symbol are calculated by $$v_{ext,n}^i = \left((V_{pos}^i[n,n])^{-1} - (v_{pri}^{i-1}[n])^{-1}\right)^{-1},$$

$$m_{ext,n}^i = v_{ext,n}^i\left(\frac{m_{pos}^i[n]}{v_{pos}^i[n,n]} - \frac{m_{pri}^{i-1}[n]}{v_{pri}^{i-1}[n]}\right).$$

3 De-mapping:

The de-mapper has two inputs:

extrinsic mean $$m_{ext,n}^i$$

and variance $$v_{ext,n}^i$$

of the data symbol from the signal detection;

a priori LLRs of coded bits $$L_{E,pri}^{i-1},$$

which are extrinsic LLRs $$L_{D,ext}^{i-1}$$

of the channel decoder.

With the a priori LLRs, the a priori symbol probability of the $n^{th}$ data symbol $$P_{pri,x_d[n]=\chi}^i$$

is expressed as $$P_{pri,x_d[n]=\chi}^{i-1} \propto \prod_{k=0}^{log_2K-1} e^{-\chi[k]L_{E,pri}^{i=1}[nlog_2K+k]}$$

where λ is the symbol from a certain modulation alphabet $\mathbb{K}$ whose modulation order is K and λ[k] indicates the $k^{th}$ bit in λ. The a posteriori symbol probability of the $n^{th}$ data symbol $$P_{pos,x_d[n]=\chi}^{i-1}$$

is then calculated by $$P_{pos,x_d[n]=\chi}^{i-1} \propto P_{pri,x_d[n]=\chi}^{i-1} \times e^{\frac{-\left|\chi - m_{ext,n}^i\right|^2}{v_{ext,n}^i}}.$$

With the a posteriori symbol probability $$P_{pos,x_d[n]=\chi}^i,$$

the a posteriori LLR of the $k^{th}$ bit of the $n^{th}$ data symbol is given by $$L_{M,pos}^i[n\log_2K + k] = \log\frac{\sum_{\chi\in\mathbb{K},\chi[k]=0} P_{pos,x_d[n]=\chi}^i}{\sum_{\chi\in\mathbb{K},\chi[k]=1} P_{pos,x_d[n]=\chi}}.$$

The corresponding extrinsic LLR is expressed as $$L_{E,ext}^i = L_{E,pos}^i - L_{E,pr}^{i-i},$$

which will be sent to the de-interleaver and the channel decoder. Note that in the initial stage i=0, $$L_{E,pri}^0$$

is set to $0_{MN\ log_2K\times 1}$.

The channel encoders and decoders that can be used in an aspect of the present invention can be of known design, i.e., convolutional coding, e.g., Turbo coding, and LDPC coding can be applied with the proposed OTFS system.

Denote $$L_{D,ext}^i \text{ and } L_{D,pos}^i$$

as the extrinsic and a posteriori LLRs from the channel decoder.

$$L_{D,ext}^i$$

will be fed back to the de-mapper as its a priori LLRs.

$$L_{D,pos}^i$$

will go through the mapper to calculate the a posteriori mean and variance of a data symbol, which will be utilized as a priori information for channel estimation and signal detection.

4 Mapping:

With a priori LLRs, which are a posteriori LLRs of the channel decoder $$L_{D,pos}^{i},$$

the a priori probability of the n$^{th}$ data symbol is given by $$P_{M,pri,X_d[n]=\chi}^{i} \propto \prod_{k=0}^{log_2 K-1} e^{-\chi[k]L_{D,pos}^{i}[nlog_2 K+k]}$$

Hence, the a priori mean and variance of the n$^{th}$ data symbol estimate to channel estimation and signal detection are expressed as $$m_{pri}^{i}[n] = \sum_{\chi\in\mathbb{A}} P_{M,pri,x_d[n]=\chi}^{i}\chi,$$

$$v_{pri}^{i} = \sum_{\chi\in\mathbb{A}} P_{M,pri,x_d[n]=\chi}^{i}|\chi|^2 - |m_{pri}^{i}[n]|^2.$$

Then, $$m_{pri}^{i}[n]$$

is fed back to the channel estimation to enhance its performance, and both $$m_{pri}^{i}[n] \text{ and } v_{pri}^{i}$$

are provided to the signal detection. Note that in the initial stage i=0, $$P_{M,pri,x_d[n]=\chi}^{0}$$

is assumed to have equal probability as 1/K.

The aforementioned iterative channel estimation, signal detection, and channel decoding procedure is repeated until a termination criterion is met. Exemplary termination criteria include:

The difference of the data estimate variance for two subsequent iterations being below a predefined threshold λ, i.e., $$|v_{pri}^{i} - v_{pri}^{i-1}| < \lambda;$$

A predetermined number of iterations I is reached.

Either of the aforementioned termination criteria will suffice to terminate the iterations.

FIG. 7 shows a block diagram of an OTFS system comprising a transmitter 300 and a receiver 400 in accordance with third and fourth aspects of the present invention, respectively. The transmitter 300 is configured for executing a method 100 of transmitting a binary data sequence over an OTFS communication channel subject to Doppler-spread in accordance with the first aspect of the present invention, including optimising the superimposed pilot power ratio. The receiver 400 is configured for executing a method 200 of receiving a binary data sequence with transmitter-side added forward error correction and pilot signals transmitted over an OTFS communication channel subject to Doppler-spread in accordance with the second aspect of the present invention, including two-staged iterative channel estimation, signal detection, and data decoding.

The transmitter 300 in accordance with the third aspect of the invention for use in an OTFS system comprises a channel encoder 302 adapted to receive a binary data sequence b, a signal mapper 306 configured to receive an output from the channel encoder and to output data signals $x_d$, a pilot signal adding unit 308 configured to add pilot signals $x_p$ to the data signals $x_d$ and to output a transmission signal x to an OTFS modulator 310 that is configured to apply an OTFS modulation to the transmission signal x, for transmission of the modulated signal over an OTFS communication channel via one or more antennas 312. The pilot signal adding unit 308 is further configured to optimise a pilot signal power ratio (a) in accordance with the embodiments of the method 100 in accordance with the first aspect of the invention.

The transmitter 300 may further comprise an interleaver 304 upstream of the signal mapper 306.

A receiver 400 in accordance with the fourth aspect of the invention for use in an OTFS system comprises an antenna 402 for receiving OTFS-modulated signals via an OTFS communication channel subject to Doppler-spread, and for providing the received signal to an OTFS demodulator 404. OTFS demodulator 404 outputs a received signal y to a channel estimator 406. Channel estimator 406 further receives an undisturbed copy of the superimposed pilot signals $x_p$, and outputs an estimation of the channel coefficients to a signal detector 408. Signal detector 408 is configured to detect transmitted signals in the received signal y and to output detected signals to a signal de-mapper 410. The de-mapped signals are provided to a channel decoder 414, which outputs a reconstructed version b' of the transmitted binary data sequence b. After an initial processing of the received signal in the processing chain described before, signals representing intermediate results of the processing are fed back to respective upstream processing blocks, for iteratively refining intermediate processing results and the ultimate output of the receiver 300 in an iterative stage. In detail, the output of the channel decoder 414 is provided to a processing unit configured for determining, for the reconstructed version b' of the transmitted binary data sequence b, values related to probabilities or likelihoods indicating that the reconstructed version b' of the transmitted binary data sequency b correctly corresponds to respective transmitted data. The values related to probabilities or likelihoods are provided to signal de-mapper 410, as a further input signal, and at least one of the values related to probabilities or likelihoods is provided, via a receiver-side signal mapper 418, to the signal detector 408 and the channel estimator 406, respectively.

In one or more embodiments of the receiver 400 the output signal of the de-mapper 410 is subtracted from the values related to probabilities or likelihoods fed back to the de-mapper 410.

In one or more embodiments of the receiver 400 a de-interleaver 412 is arranged between the signal de-mapper 410 and the channel decoder 414, and an interleaver 416 is arranged to receive the output signal of the processing unit configured for determining values related to probabilities or likelihoods, and at least one of the values related to probabilities or likelihoods output by said interleaver 416 is fed back to the de-mapper 410 and, via the receiver-side signal mapper 418, to the signal detector 408 and the channel estimator 406, respectively.

The various functional blocks of the transmitter 300 and the receiver 400 may be implemented by computer program instructions stored in a non-volatile memory and executed by a microprocessor in cooperation with a random-access memory. One or more of the functional blocks of the transmitter 300 or the receiver 400 may be implemented at least in part on a dedicated hardware which is controlled by computer program instructions executed by the microprocessor.

Monte Carlo simulations have been carried out to demonstrate the performance of the proposed OTFS system. The simulation setting is shown in Table I.

TABLE I

| System Parameter | Value |
|---|---|
| Carrier frequency (fc) | 4 GHz |
| Subcarrier spacing (Δf) | 15 kHz |
| Number of delay bins (M) | 128 |
| Number of Doppler bins (N) | 16 |
| Channel model | 5G TDL-B |
| Vehicle speed (v) | 125 km/h |
| Modulation scheme | QPSK |
| Channel coding | LDPC coding with a coding rate of ½ |

The numbers of OTFS delay and Doppler bins are set to M=128 and N=16. The carrier frequency and subcarrier spacing are set to $f_c$=4 GHz and Δf=15 kHz. A 5G TDL-B channel model [16] with channel length L=5 and Jakes' Doppler spectrum is adopted. The vehicle speed is 125 km/h and the modulation scheme is quadrature PSK (QPSK). LDPC coding with a coding rate of ½ is utilized.

FIGS. 8 and 9 show the SINR and BER, respectively, of the proposed OTFS system as a function of superimposed pilot power ratio α for EbN0=10 dB. The theoretical value of optimal α is calculated as approximately α*=0.2659 by solving the function $$\frac{dSINR(\alpha)}{d\alpha} = 0$$

with the expression for SINR(α) derived further above. In FIGS. 8 and 9 it can be seen that α*=0.2659 yields the highest SINR and the lowest BER, which validates the effectiveness of the proposed superimposed pilot power ratio optimization algorithm described herein.

FIGS. 10 and 11, respectively, show the MSE of the channel estimation and the BER of the proposed OTFS system as a function of the number of iterations for EbN0=7.5 dB and EbN0=10 dB. The proposed OTFS system converges fast within 2 iterations for both the MSE of the channel estimation and the BER thanks to the optimization of the superimposed pilot power ratio α described further above.

FIG. 12 shows the extrinsic information transfer (EXIT) charts and trajectory path of the proposed OTFS system for EbN0=10 dB. The trajectory path consists of 2 steps, which indicates 2 iterations are required for the proposed OTFS system. The convergence speed through EXIT chart analysis in FIG. 12 coincides with what can be observed in FIGS. 10 and 11.

FIG. 13 shows the BER of the proposed OTFS system in comparison to exemplary existing schemes that do not consider the channel coding, e.g., as presented by H. Qu, G. Liu, L. Zhang, M. A. Imran, and S. Wen in "Low-dimensional subspace estimation of continuous Doppler-spread channel in OTFS systems," IEEE Trans. Commun., vol. 69, no. 7, pp. 4717-4731, 2021 (denoted "LSQR" in the figure), by P. Singh, S. Tiwari, and R. Budhiraja in "Low-complexity LMMSE receiver design for practical-pulse-shaped MIMO-OTFS systems," IEEE Trans. Commun., vol. 70, no. 12, pp. 8383-8399, 2022, (denoted "LMMSE" in the figure), and by P. Raviteja, K. T. Phan, Y. Hong, and E. Viterbo in "Interference cancellation and iterative detection for orthogonal time frequency space modulation," IEEE Trans. Wireless Commun., vol. 17, no. 10, pp. 65016515, 2018, (denoted "MP" in the figure).

In the comparison perfect channel estimation is assumed. Note that the MP equalization algorithm in discussed by P. Raviteja, K. T. Phan, Y. Hong, and E. Viterbo in "Interference cancellation and iterative detection for orthogonal time frequency space modulation" was adopted in the present inventors' previous works "Near-optimal BEM OTFS receiver with low pilot overhead for high-mobility communications" and "BEM OTFS receiver with superimposed pilots over channels with doppler and delay spread". It can be seen that the proposed OTFS system with channel coding significantly outperforms the exemplary existing schemes, and an SNR gain of up to 5 dB can be achieved. Note that perfect channel estimation is assumed for the benchmark.

FIG. 14 compares the BER of the proposed OTFS system with the exemplary existing scheme presented by H. Qu, G. Liu, L. Zhang, M. A. Imran, and S. Wen in "Low-dimensional subspace estimation of continuous Doppler-spread channel in OTFS systems," which adopts convolutional coding. The proposed OTFS system slightly underperforms this exemplary existing scheme when EbN0 is below 5 dB. For EbN0>5 dB, an EbN0 gain of up to 4 dB can be obtained by the proposed OTFS system. Note that perfect channel estimation is assumed for the benchmark.

FIGS. 15 and 16, respectively, present the MSE of the channel estimation and the coded BER of the proposed OTFS system in comparison to the exemplary existing scheme used in FIG. 14. For a fair comparison, identical pilot power ratios α=10% are chosen for the two schemes. The proposed OTFS system has zero dedicated pilot overhead, i.e., λ=0, while the exemplary existing scheme requires a dedicated pilot overhead of λ=10%. The proposed OTFS system underperforms the exemplary existing scheme at low EbN0 because the exemplary existing scheme is assisted by dedicated pilots, and there is no interference between pilots and data. In contrast, the proposed OTFS system is based on superimposed pilots, and interference between pilots and data always exists. Due to data interference and big noise variance at low EbN0, the superimposed pilot-based channel estimation cannot give a good channel estimate and data estimate and, thus, the following data-aided channel estimation cannot further refine channel estimation. This situation is alleviated at medium to high EbN0. Specifically, for EbN0>6 dB, an EbN0 gain of 4 dB can be achieved by the proposed OTFS system over the exemplary existing scheme. Hence, the proposed OTFS system does not only provide an improved spectral efficiency, but also attains higher reliability than the existing the exemplary scheme, in particular at medium to high EbN0.

The methods presented hereinbefore, and the apparatus implementing the methods, advantageously apply a novel derivation and analytical expression of the SINR that can be used, inter alia, for practical OTFS communication channels subject to Doppler-spread as well as for less demanding Doppler-shift channels. The new analytical SINR expression permits determining an optimised power ratio of the superimposed pilot signals at the transmitter side exclusively using information readily available at the transmitter side, i.e., without having to rely on end-to-end trials or on information fed back to the transmitter via the communication channel or through other means, which consume additional resources and add latency. The required information includes OTFS system parameters and several channel information parameters, e.g., channel correlation matrix, noise variance, etc. This greatly saves time and resources, including power, computations, and bandwidth on the communication channel, and permits dynamic adaptation of the superimposed pilot power ratio whenever indicated by changes in the communication environment. Adjusting the superimposed pilot power ratio depending on the type or shape of the Doppler spectrum found or expected in a respective use case further allows for achieving a respective optimal SNR. The receiver's two-stage iterative design, embodiments of which apply and integrate the Turbo concept to an OTFS system, has a low complexity and provides a fast convergence, thereby reducing latency. The optimised pilot signal power ratio further improves the benefits provided by the iterative channel estimation, signal detection, and data decoding, including the convergence speed at the receiver, while maintaining the higher spectral efficiency of superimposed pilot signals over dedicated pilot signals. Including the channel decoding into the iterations for the channel estimation results in an increased performance in terms of MSE of the channel estimation and BER, in particular at medium to high EbN0.

In accordance with a fifth aspect of the invention, a wireless communication device, e.g., a transmitter or receiver of a base station or a user equipment, comprises one or more microprocessors, volatile and non-volatile memory, and wireless interface circuitry configured for transmitting and/or receiving electromagnetic signals via one or multiple antennas. The various elements are communicatively connected via one or more data or signal lines or buses. The non-volatile memory stores computer program instructions which, when executed by the microprocessor, configure the wireless device to execute the method in accordance with the first or second aspect of the invention as presented above.

The methods described hereinbefore may be represented by computer program instructions. Accordingly, a computer program product comprises computer program instructions which, when executed by a microprocessor of a transmitter, cause the microprocessor to execute methods in accordance with the first aspect of the present invention, and to accordingly control hardware components of the transmitter of an OTFS communication system in accordance with the third aspect of the invention as presented above. When executed by a microprocessor of a receiver, the computer program instructions cause the microprocessor to execute methods in accordance with the second aspect of the present invention, and to accordingly control hardware components of the receiver of an OTFS communication system in accordance with the fourth aspect of the present invention as presented above.

The computer program instructions may be retrievably stored or transmitted on a computer-readable medium or data carrier. The medium or the data carrier may by physically embodied, e.g., in the form of a hard disk, solid state disk, flash memory device or the like. However, the medium or the data carrier may also comprise a modulated electromagnetic, electrical, or optical signal that is received by the computer by means of a corresponding receiver, and that is transferred to and stored in a memory of the computer.

The methods and the apparatus configured to execute the methods proposed herein can advantageously be used, inter alia, in all kinds of OTFS wireless communication systems. The proposed methods and the corresponding apparatus may be advantageously used in highly mobile devices, such as vehicles, trains, planes and the like.

BRIEF DESCRIPTION OF THE DRAWING

The figures in the attached drawing are used for detailing aspects of the present invention. In the drawing

In the figures, identical or similar elements may be referenced using the same reference designators.

DETAILED DESCRIPTION OF EMBODIMENTS

FIGS. 1 to 16 and 18 to 28 have been described further above and will not be discussed again.

Figure 1:
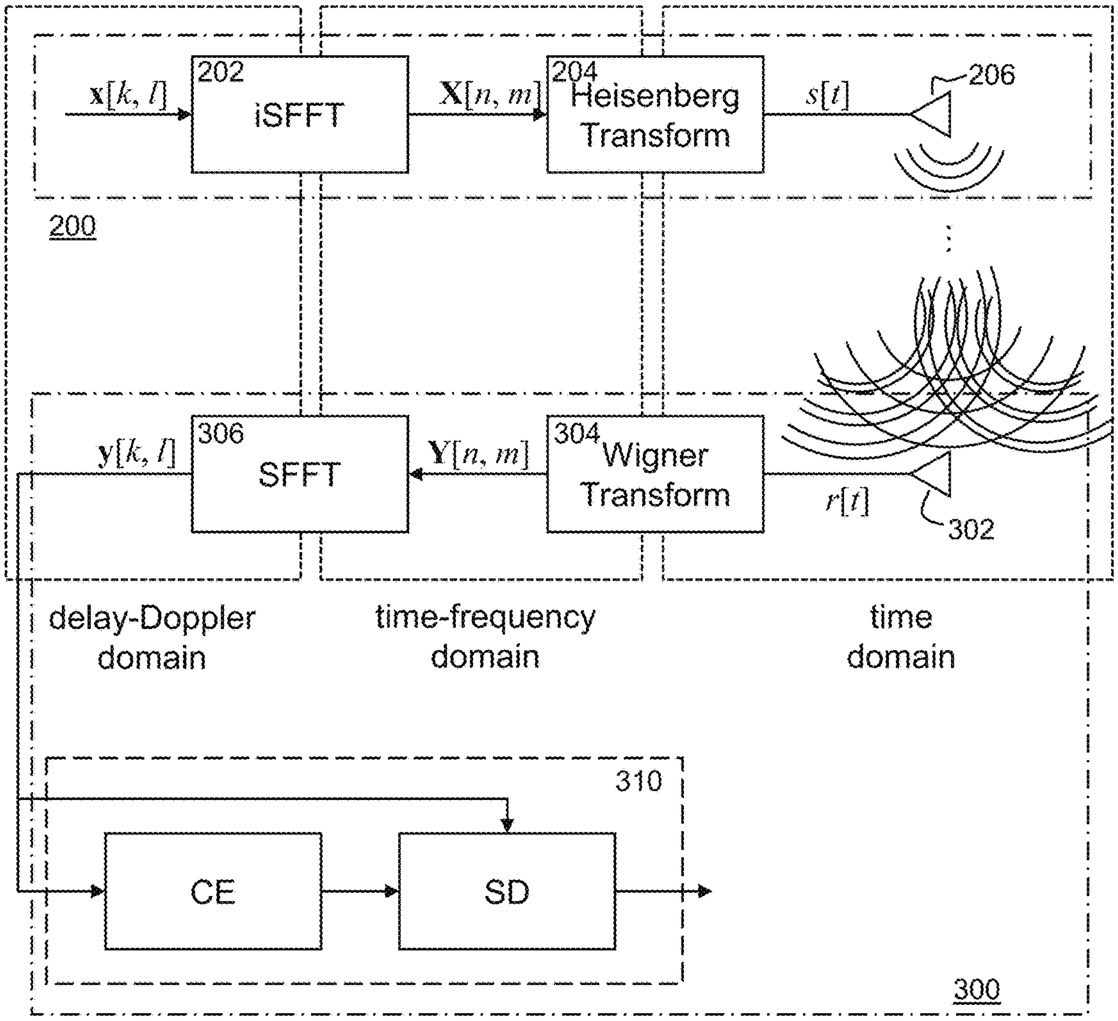
FIG. 1 shows a block diagram of a general OTFS transmission system.
Figure 2:
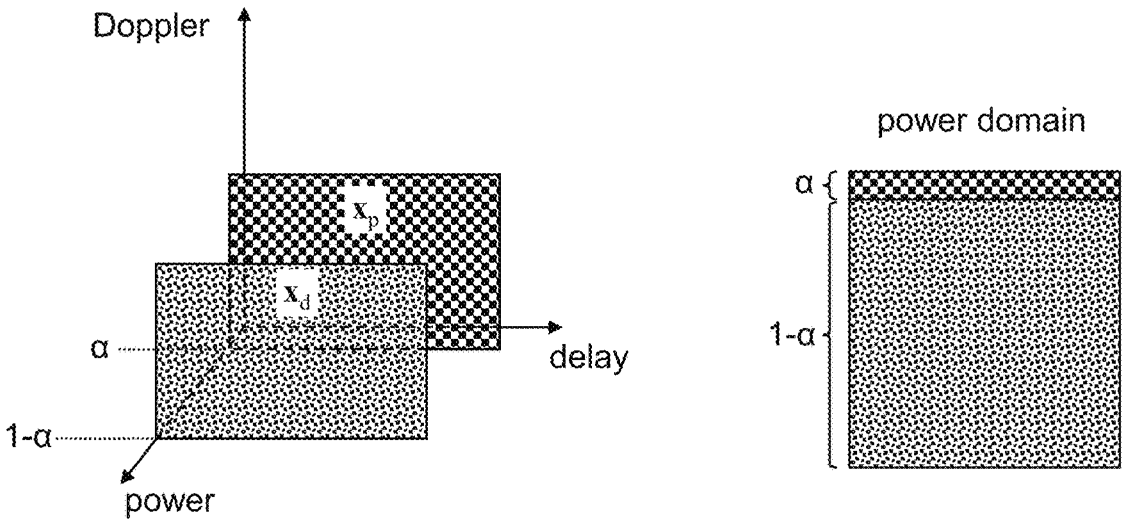
FIG. 2 shows an illustration of superimposed pilots.
Figure 3:
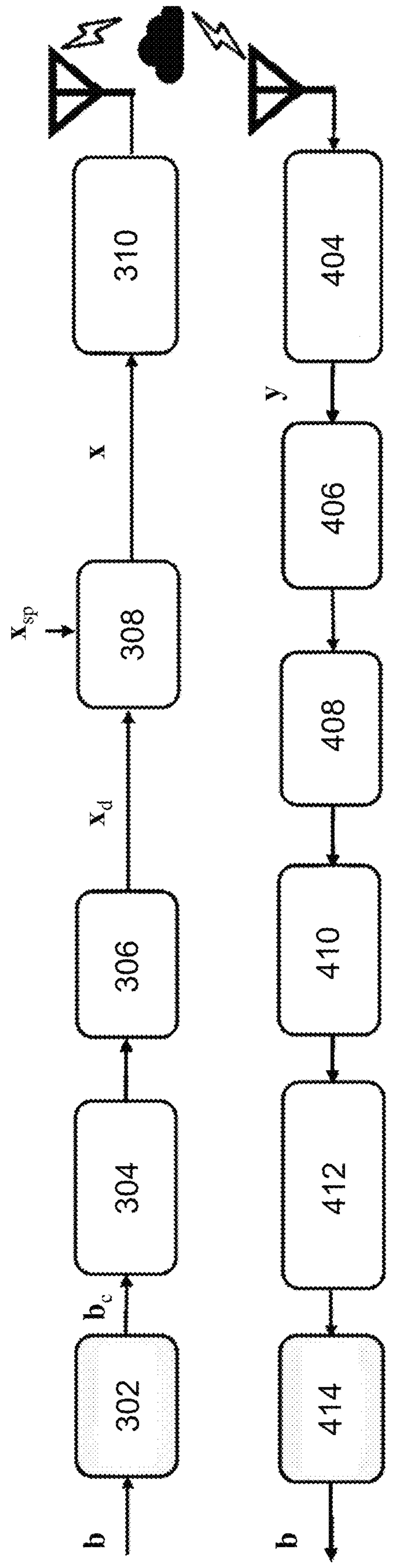
FIG. 3 illustrates a block diagram of an exemplary coded OTFS system.
Figure 4:
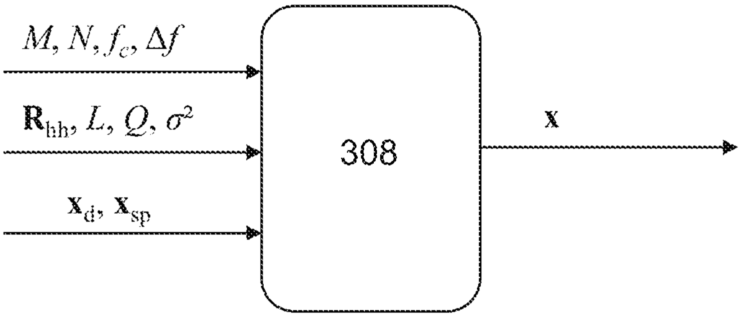
FIG. 4 shows a diagrammatic representation of the inputs to and output of the pilot signal adding unit that performs the method of optimizing the pilot power ratio optimization at the transmitter side in accordance with the first aspect of the present invention.
Figure 5:
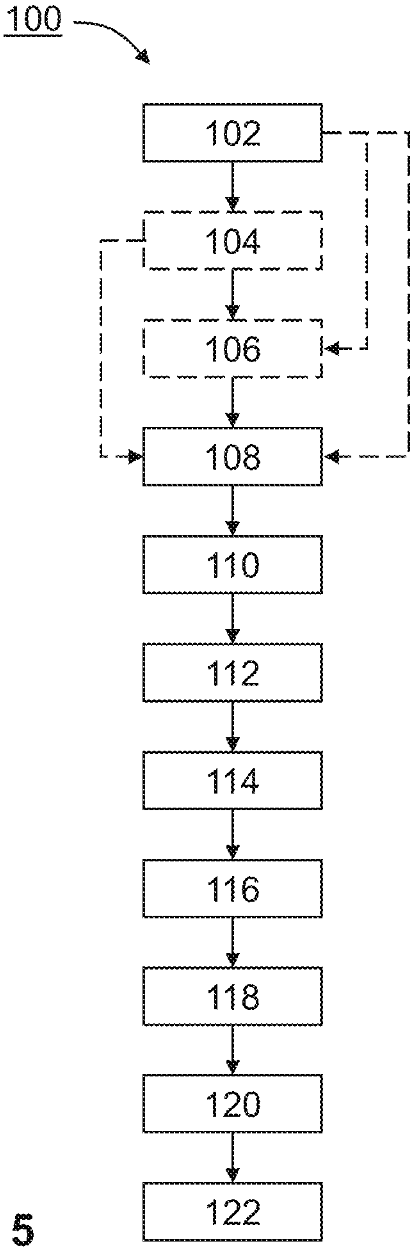
FIG. 5 shows an exemplar flow diagram of a method of transmitting a binary data sequence over an OTFS communication channel subject to Doppler-spread in accordance with the first aspect of the present invention.
Figure 6:
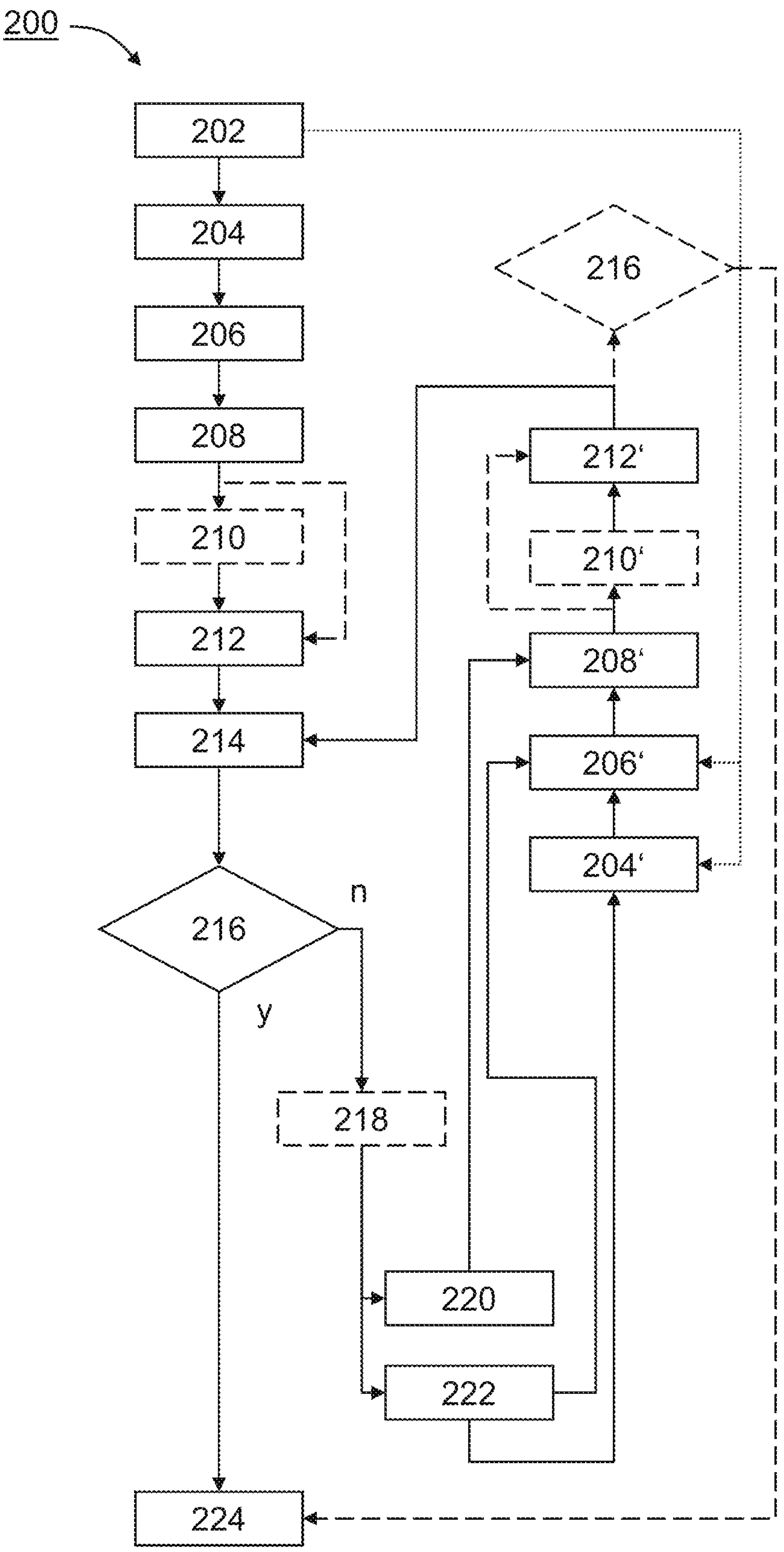
FIG. 6 shows an exemplary flow diagram of the various steps of the method of receiving a binary data sequence with transmitter-side added forward error correction and pilot signals transmitted over an OTFS communication channel subject to Doppler-spread in accordance with the second aspect of the present invention.
Figure 7:
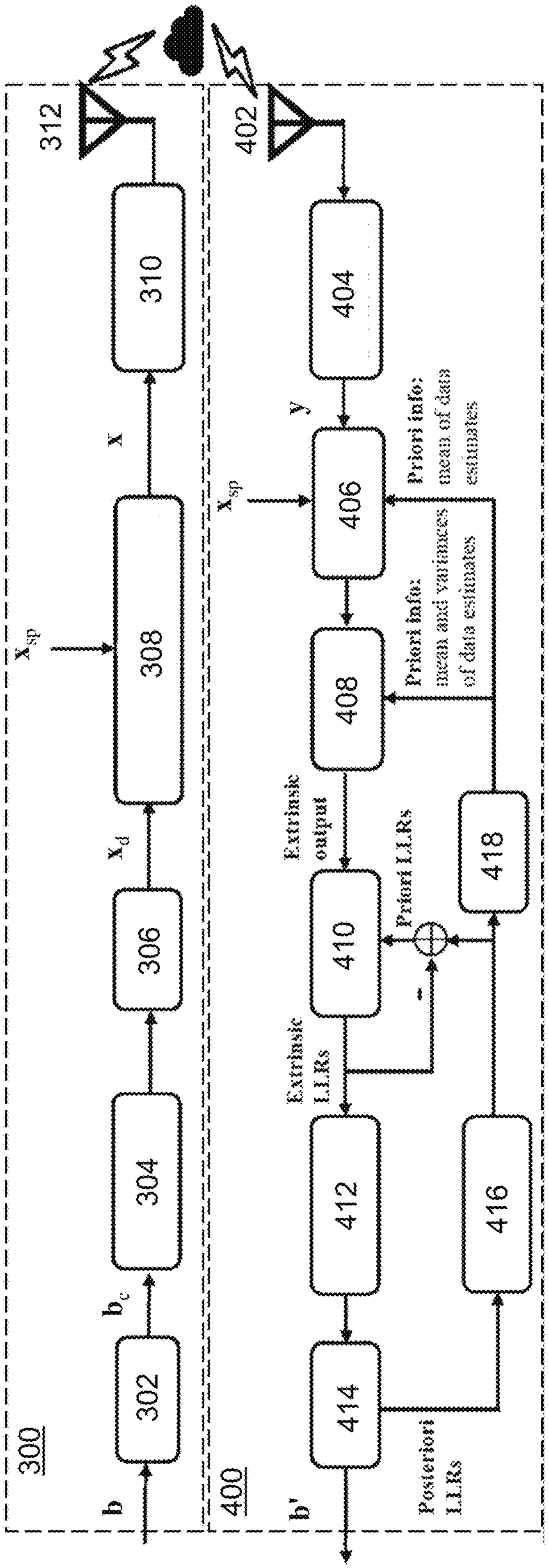
FIG. 7 shows a block diagram of an OTFS system comprising a transmitter and a receiver in accordance with third and fourth aspects of the present invention, respectively.
Figure 8:
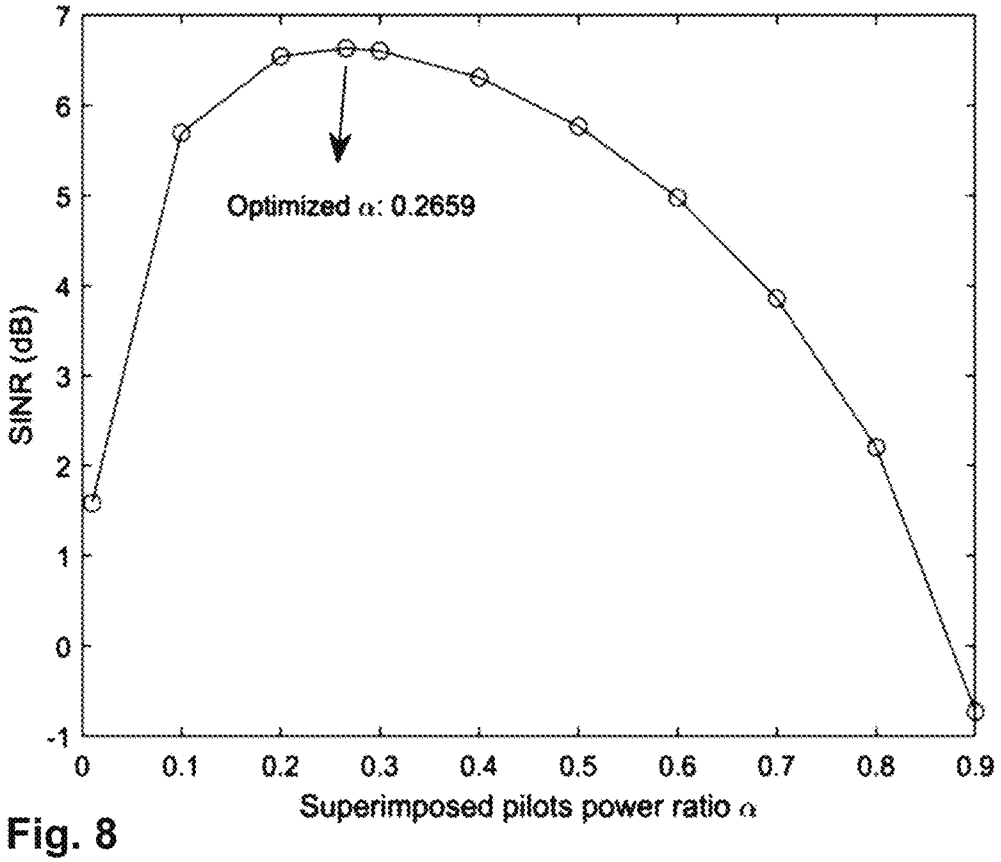
FIG. 8 shows the SINR of the proposed OTFS system as a function of superimposed pilot power ratio $\alpha$ for EbN0=10 dB.
Figure 9:
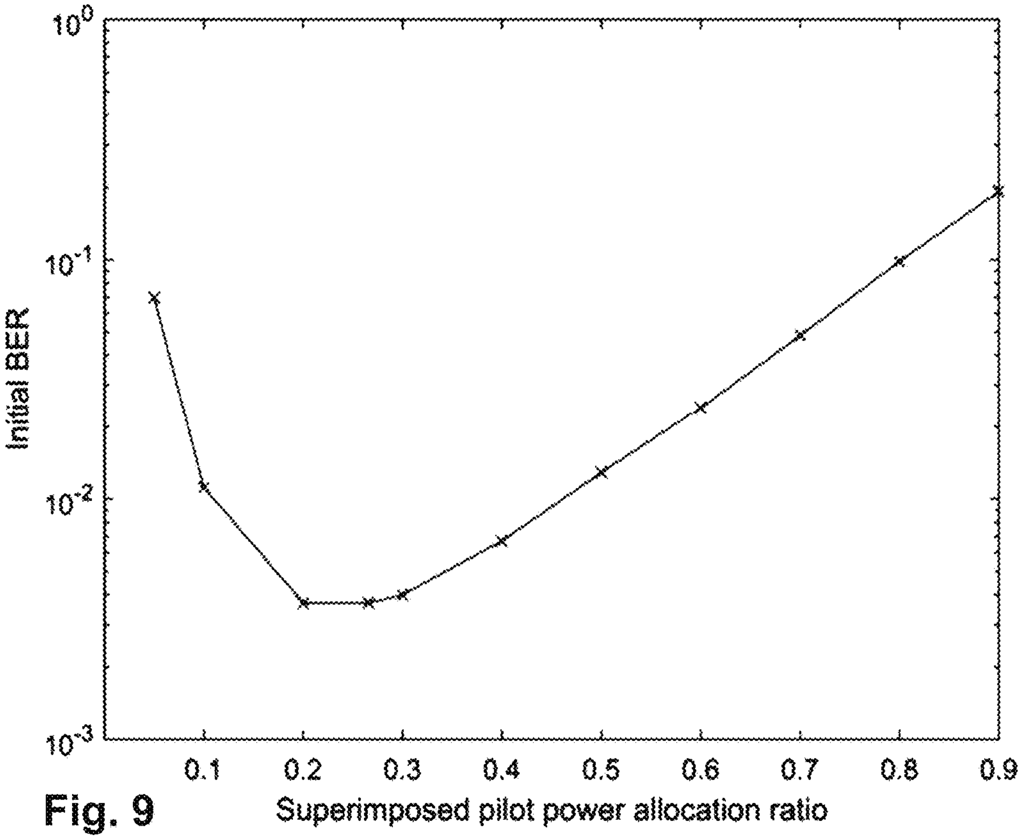
FIG. 9 shows the BER of the proposed OTFS system as a function of superimposed pilot power ratio $\alpha$ for EbN0=10 dB.
Figure 10:
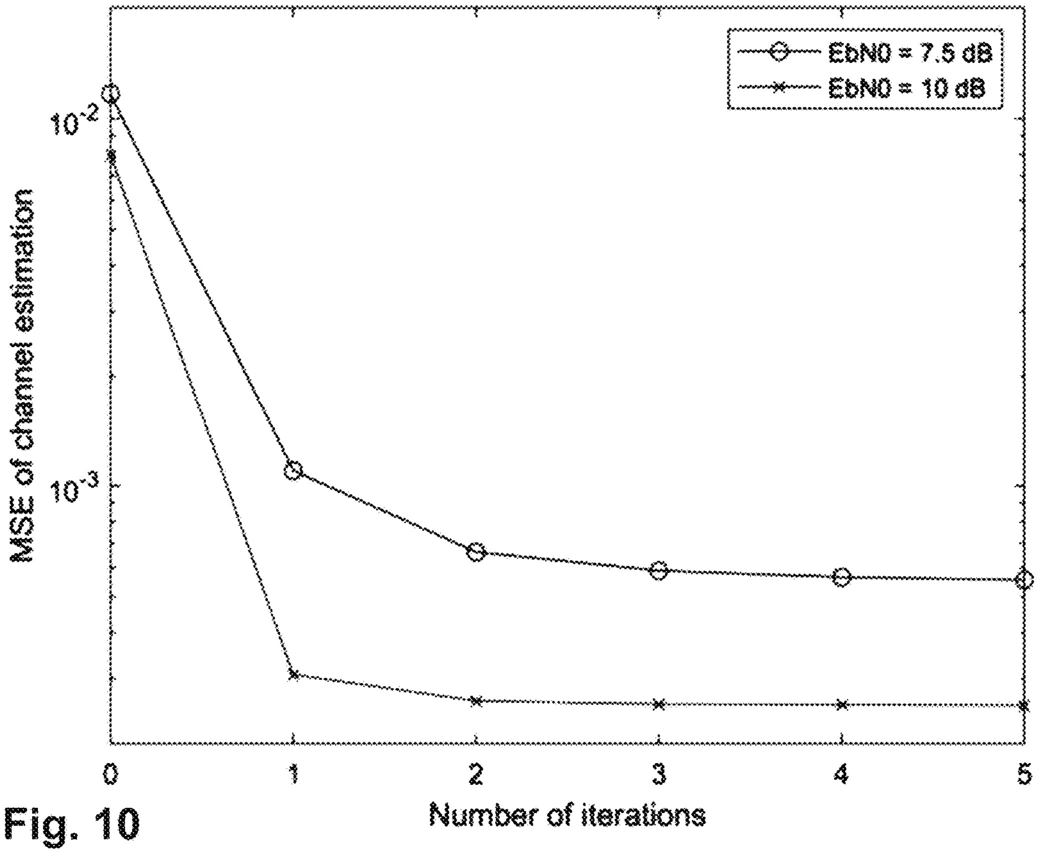
FIG. 10 shows the MSE of the channel estimation of the proposed OTFS system as a function of the number of iterations for EbN0=7.5 dB and EbN0=10 dB.
Figure 11:
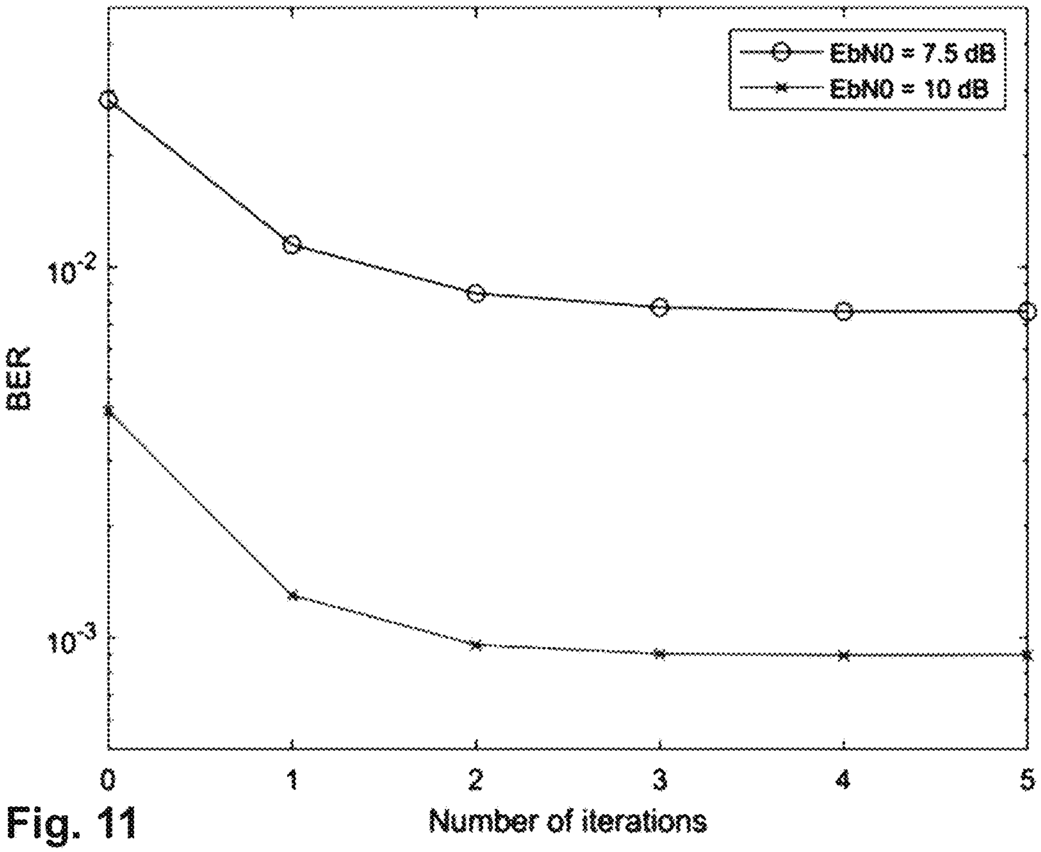
FIG. 11 shows the BER of the proposed OTFS system as a function of the number of iterations for EbN0=7.5 dB and EbN0=10 dB.
Figure 12:
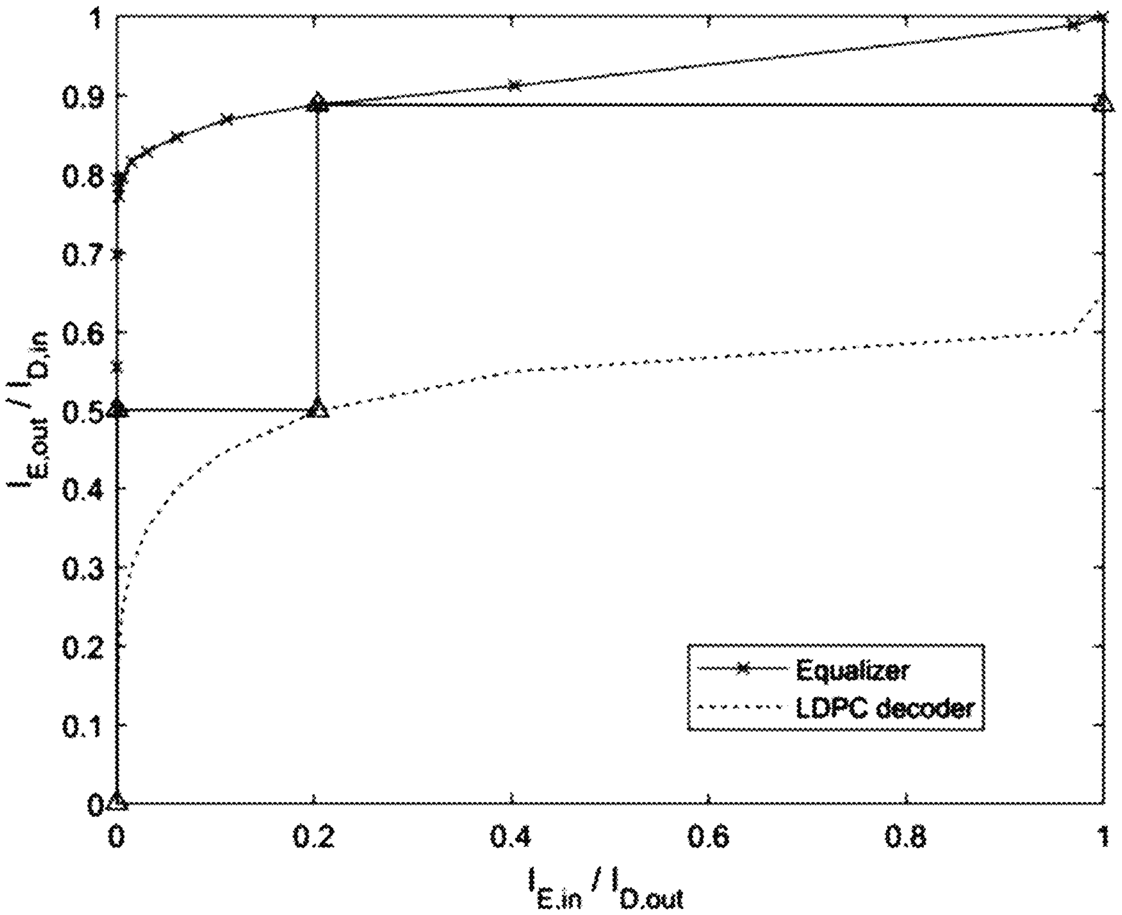
FIG. 12 shows the extrinsic information transfer (EXIT) charts and trajectory path of the proposed OTFS system for EbN0=10 dB.
Figure 17:
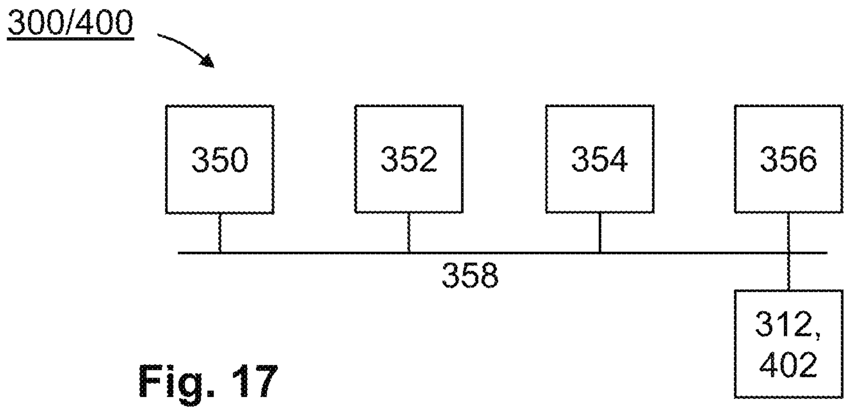
FIG. 17 shows an exemplary block diagram of a transmitter or a receiver, respectively, in accordance with embodiments of the third, fourth or fifth aspect of the present invention.
Figure 13:
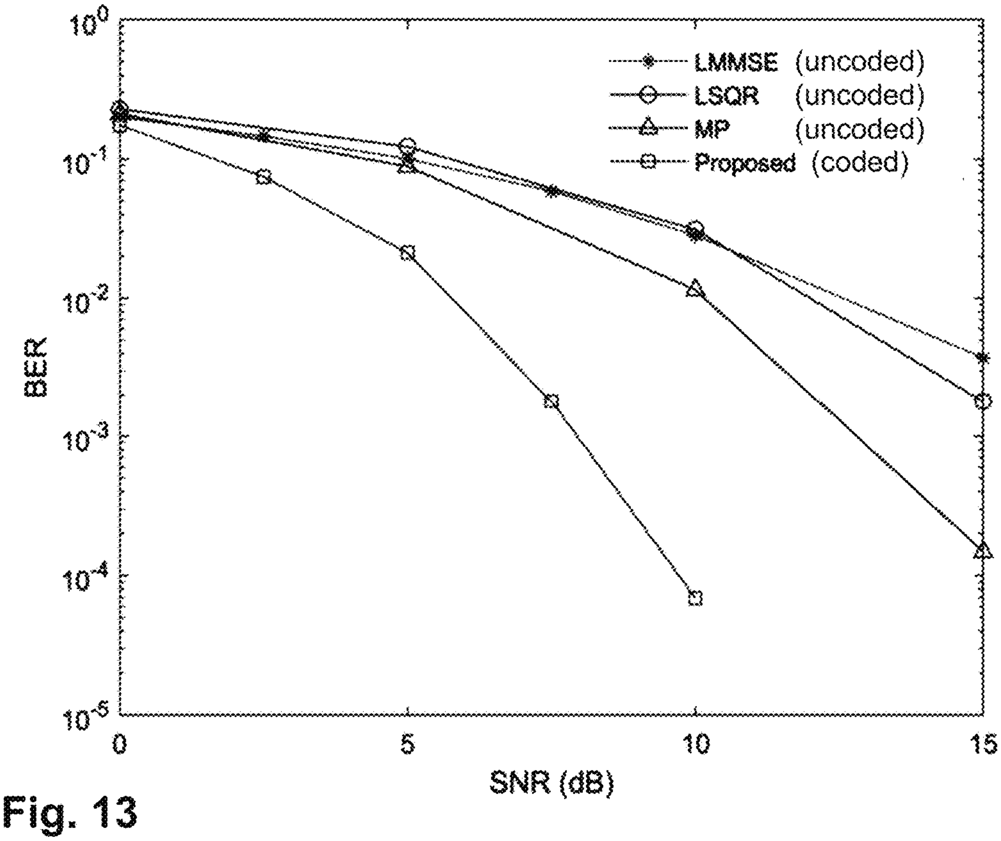
FIG. 13 shows the BER of the proposed OTFS system in comparison to exemplary existing schemes that do not consider the channel coding, FIG. 14 compares the BER of the proposed OTFS system with an exemplary existing scheme.
Figure 14:
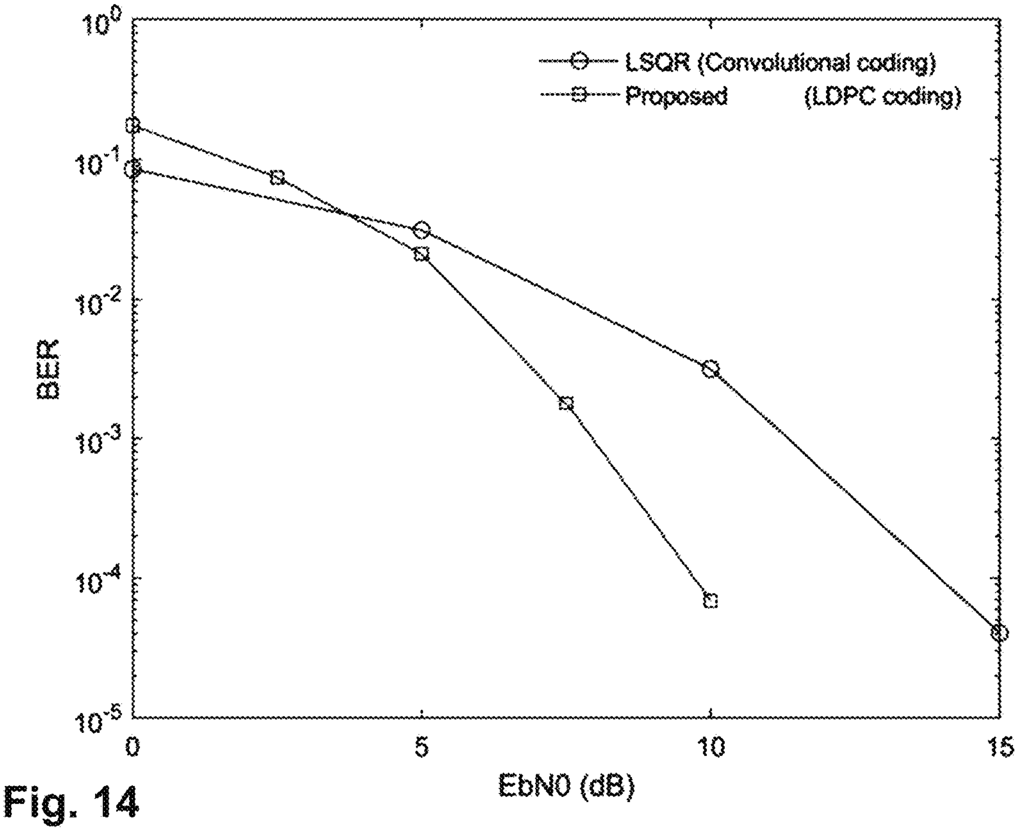
Figure 15:
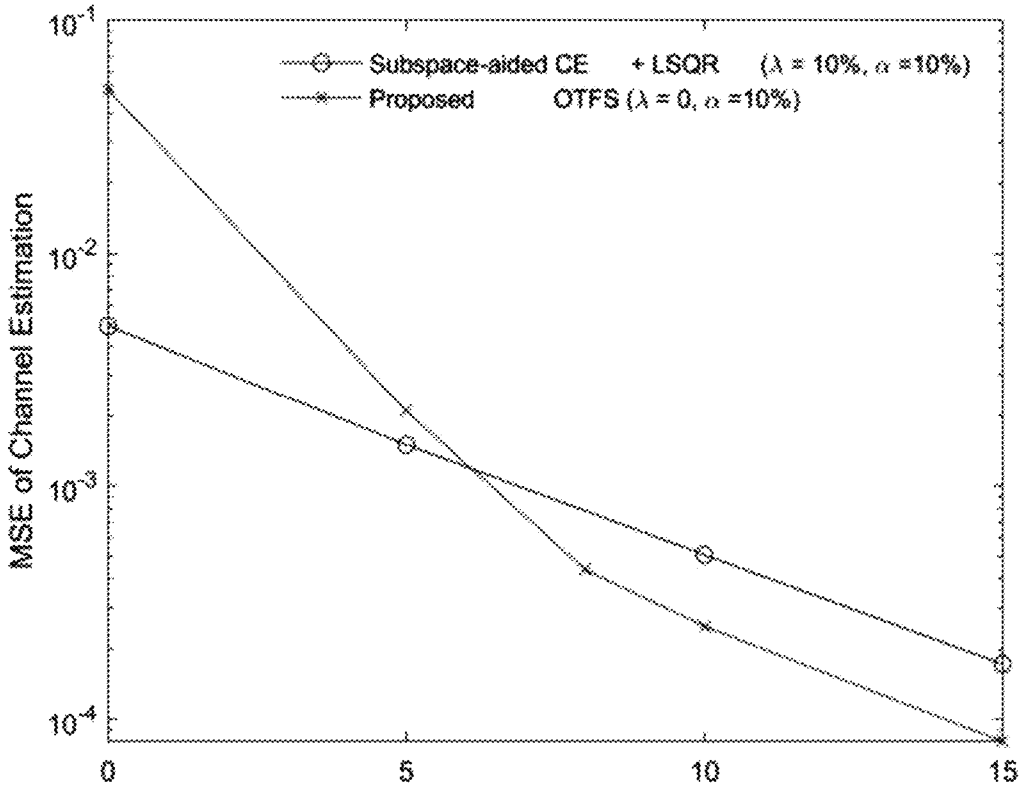
FIG. 15 presents the MSE of the channel estimation of the proposed OTFS system in comparison to the exemplary existing scheme used in FIG. 14.
Figure 16:
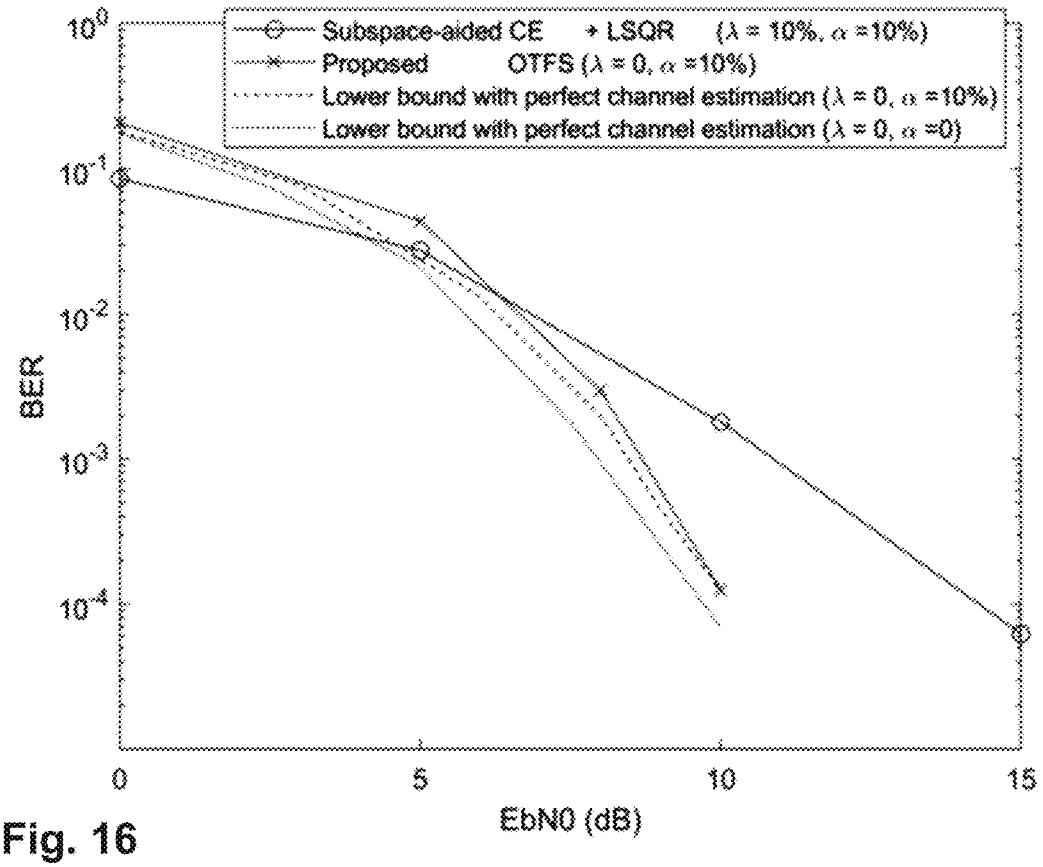
FIG. 16 presents the coded BER of the proposed OTFS system in comparison to the exemplary existing scheme used in FIG. 14.
Figure 18:
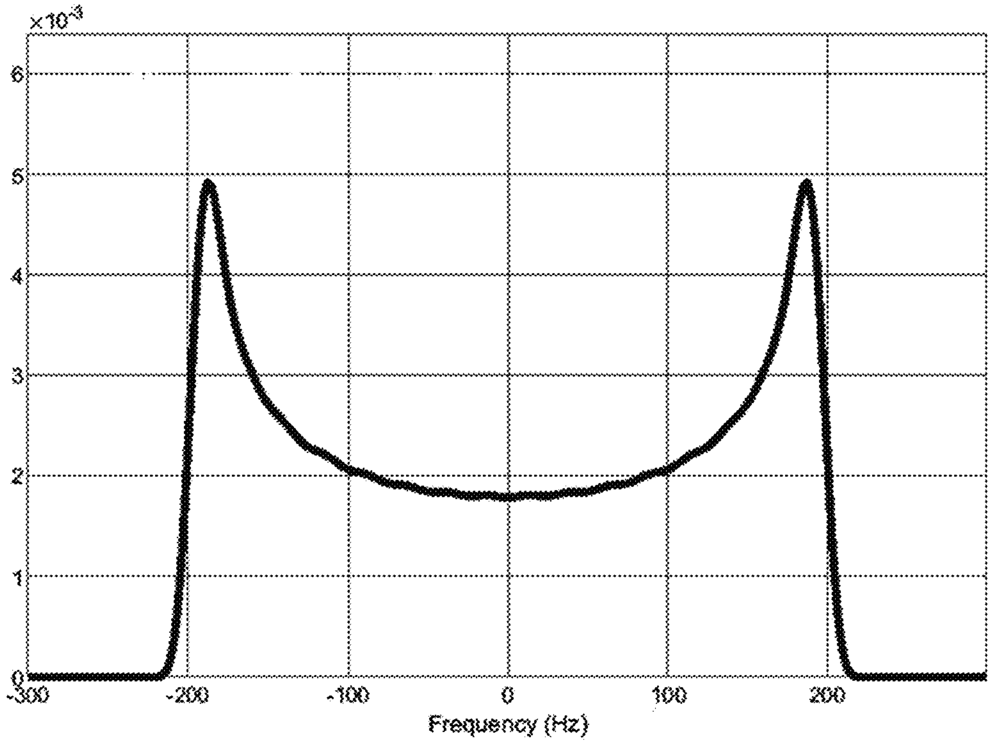
FIGS. 18-FIG. 23 show various exemplary basic shapes of Doppler spectrae that can be used depending on an environment.
Figure 19:
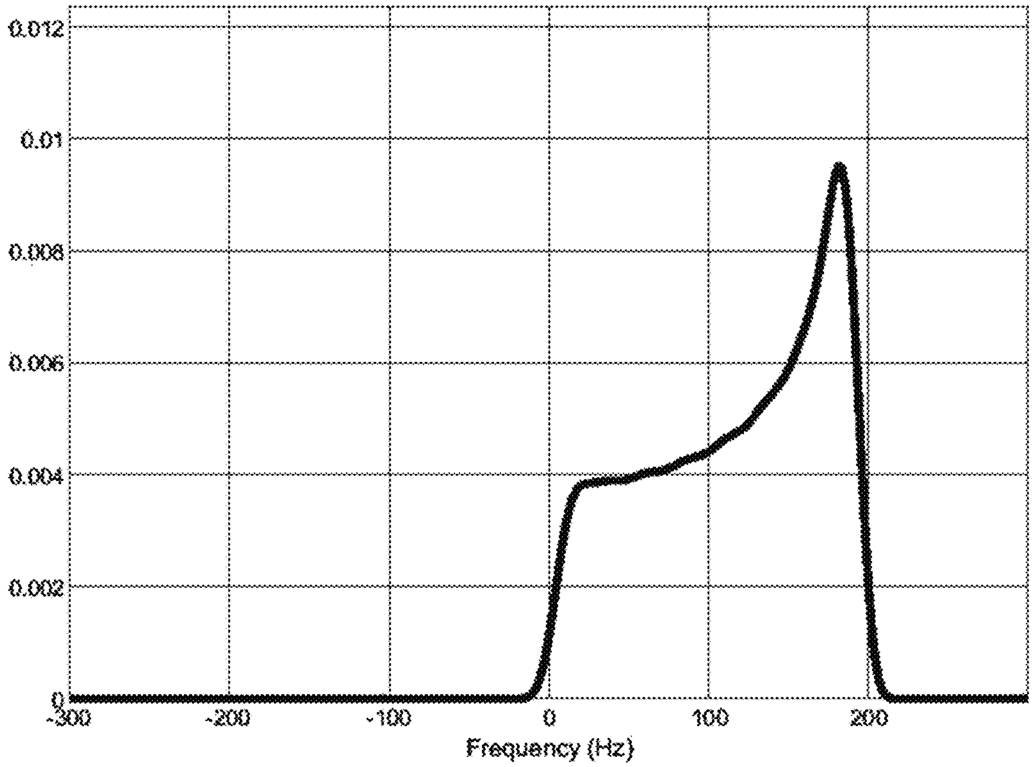
Figure 20:
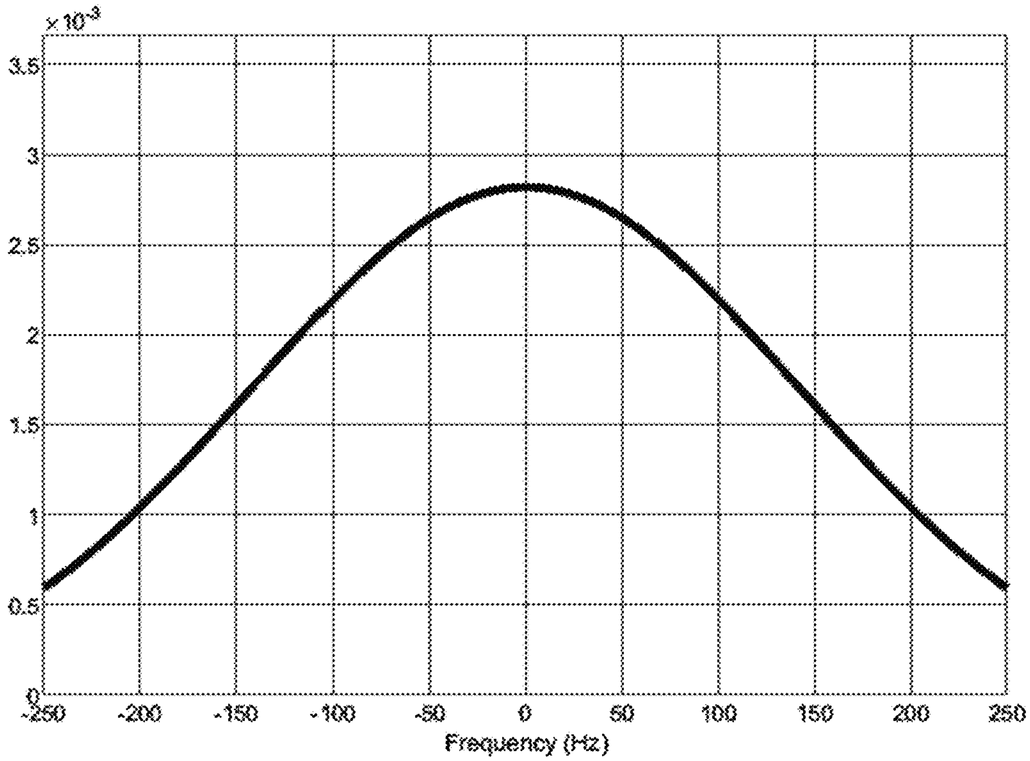
Figure 21:
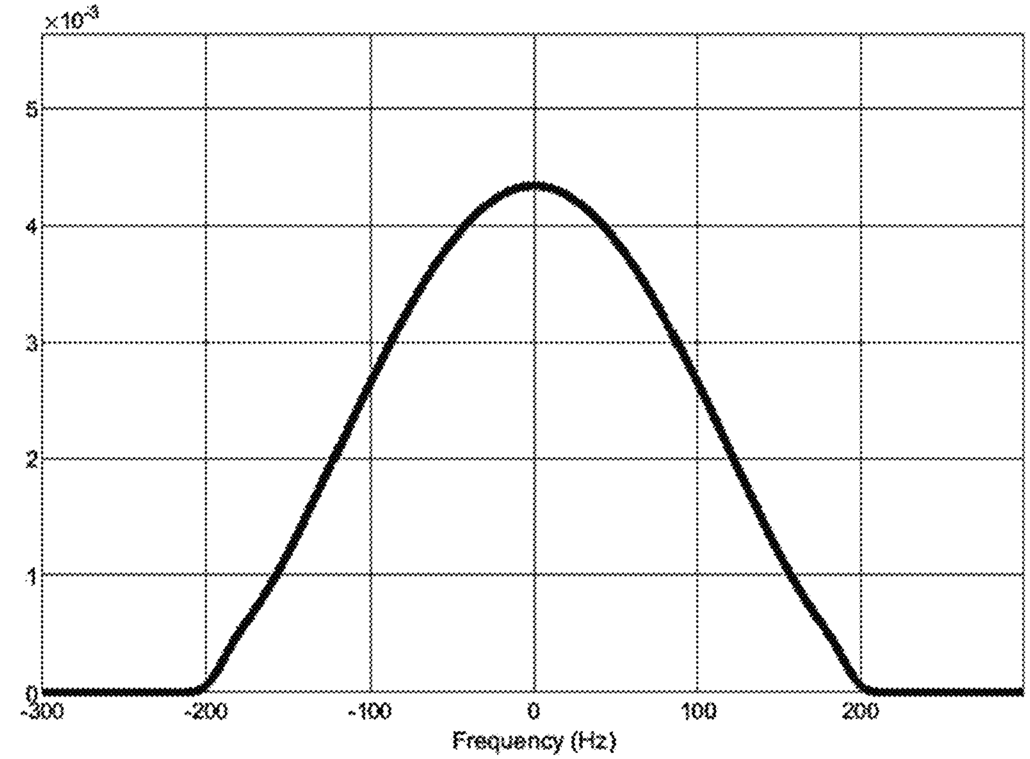
Figure 22:
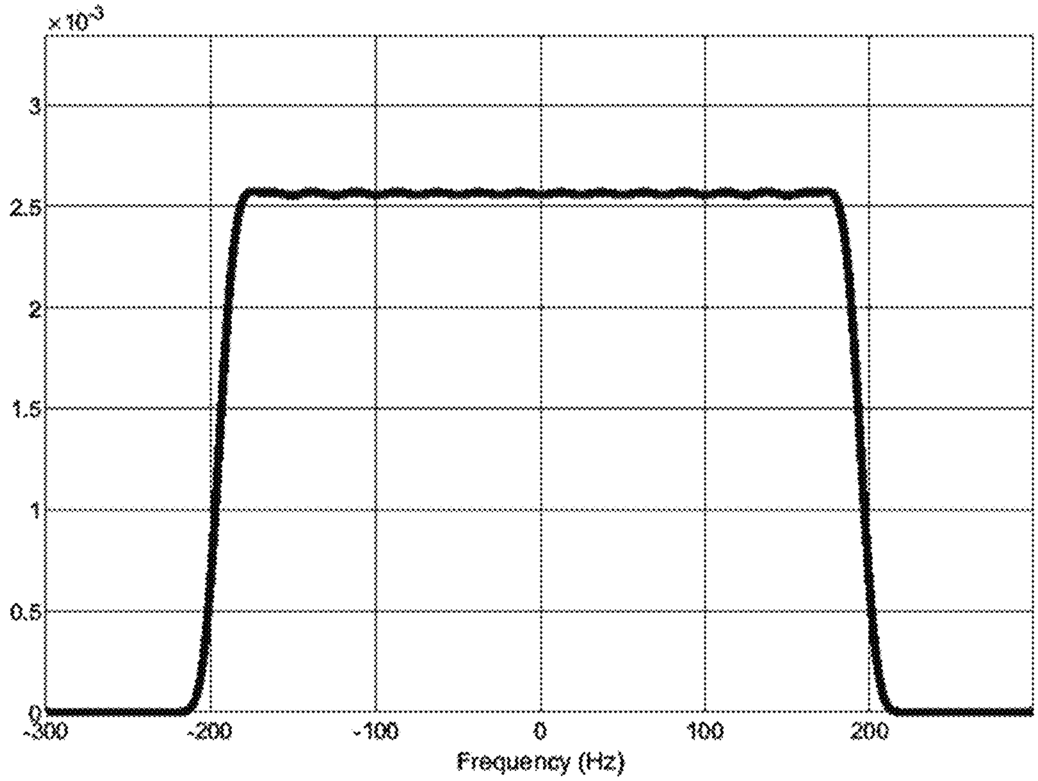
Figure 23:
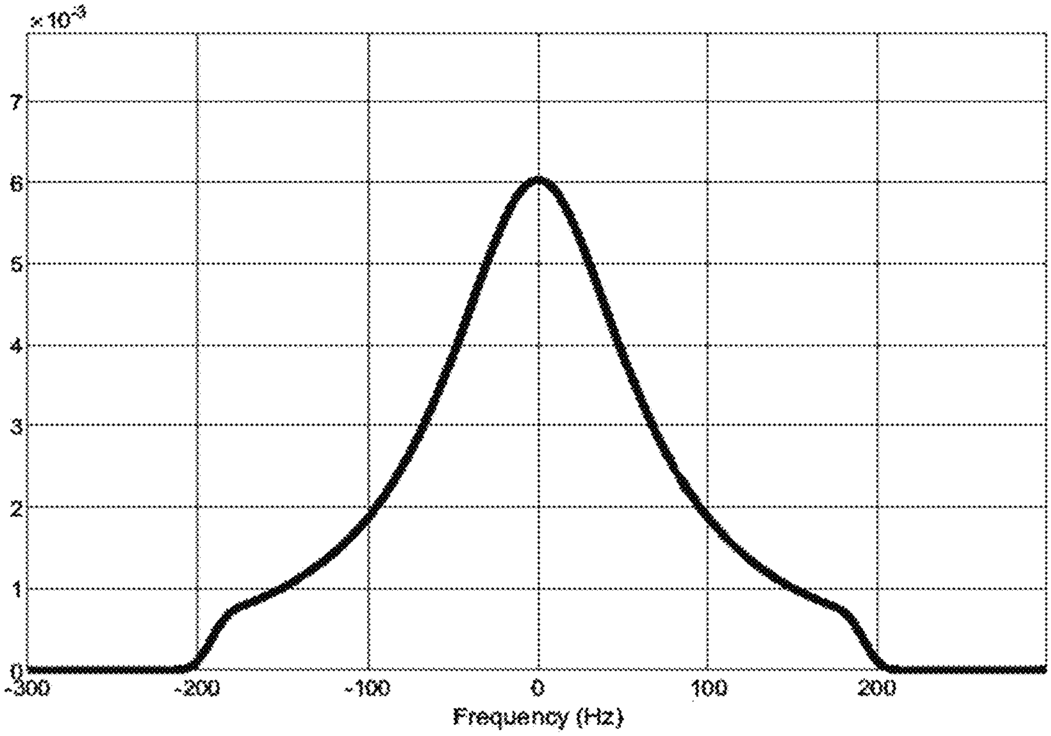
Figure 24:
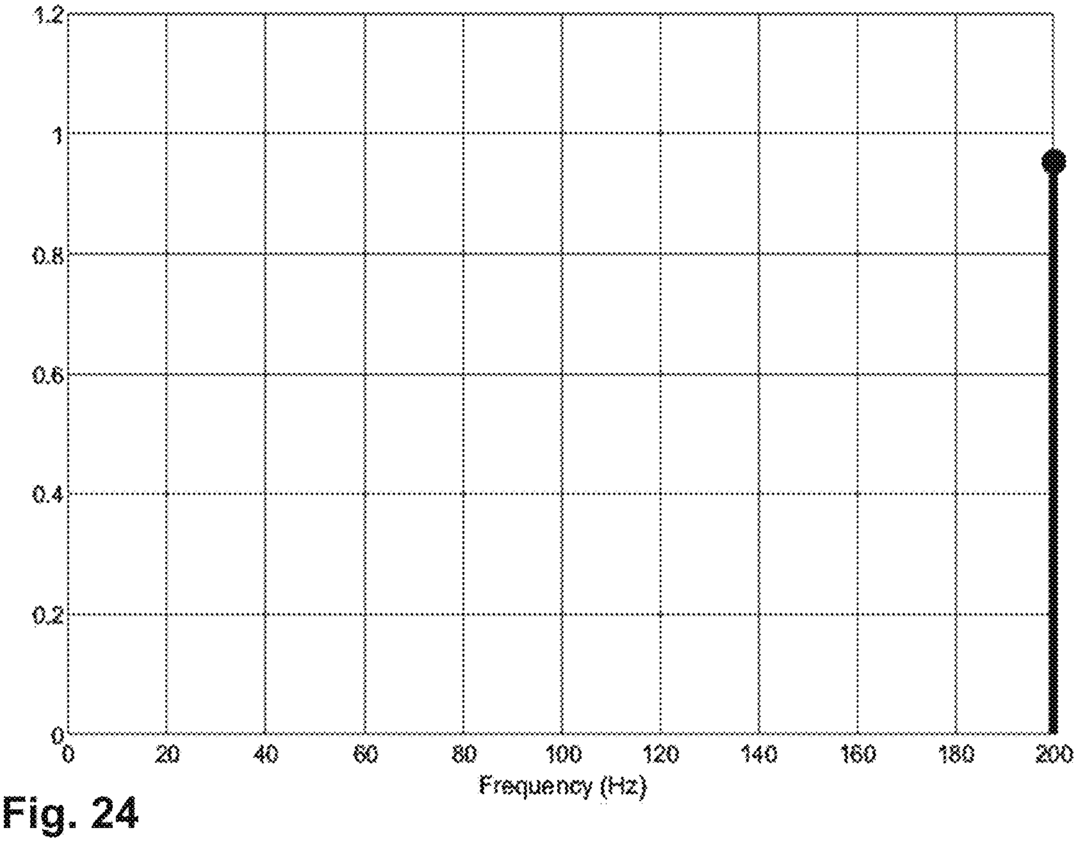
FIG. 24 shows an exemplary representation of Doppler shift.
Figure 25:
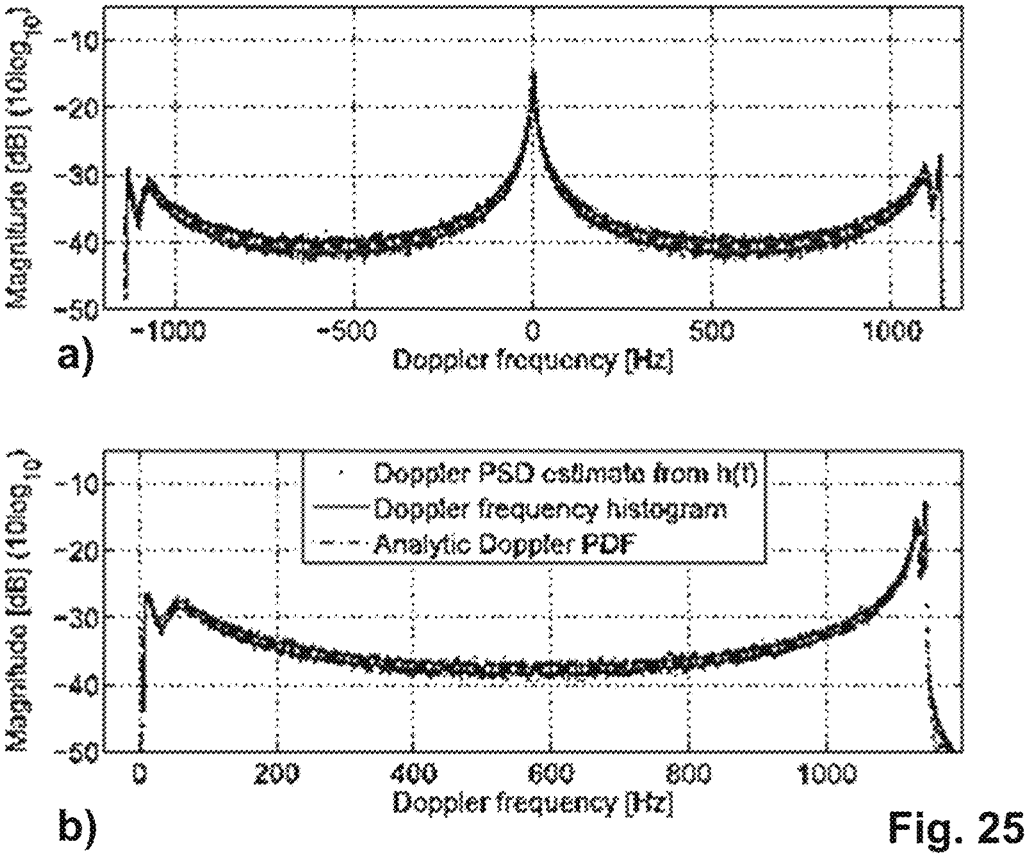
FIG. 25 shows exemplary realistic Doppler spectrae for different environments.
Figure 26:
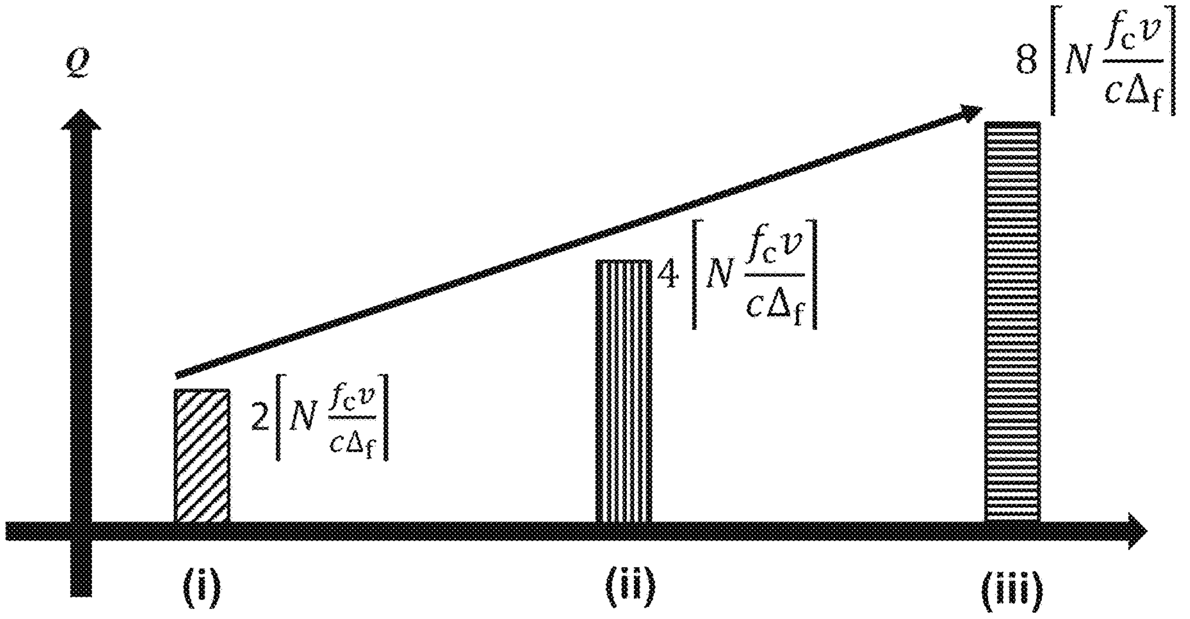
FIG. 26 shows a schematic representation of the dependence of the required BEM order for different Doppler spectrum types.
Figure 27:
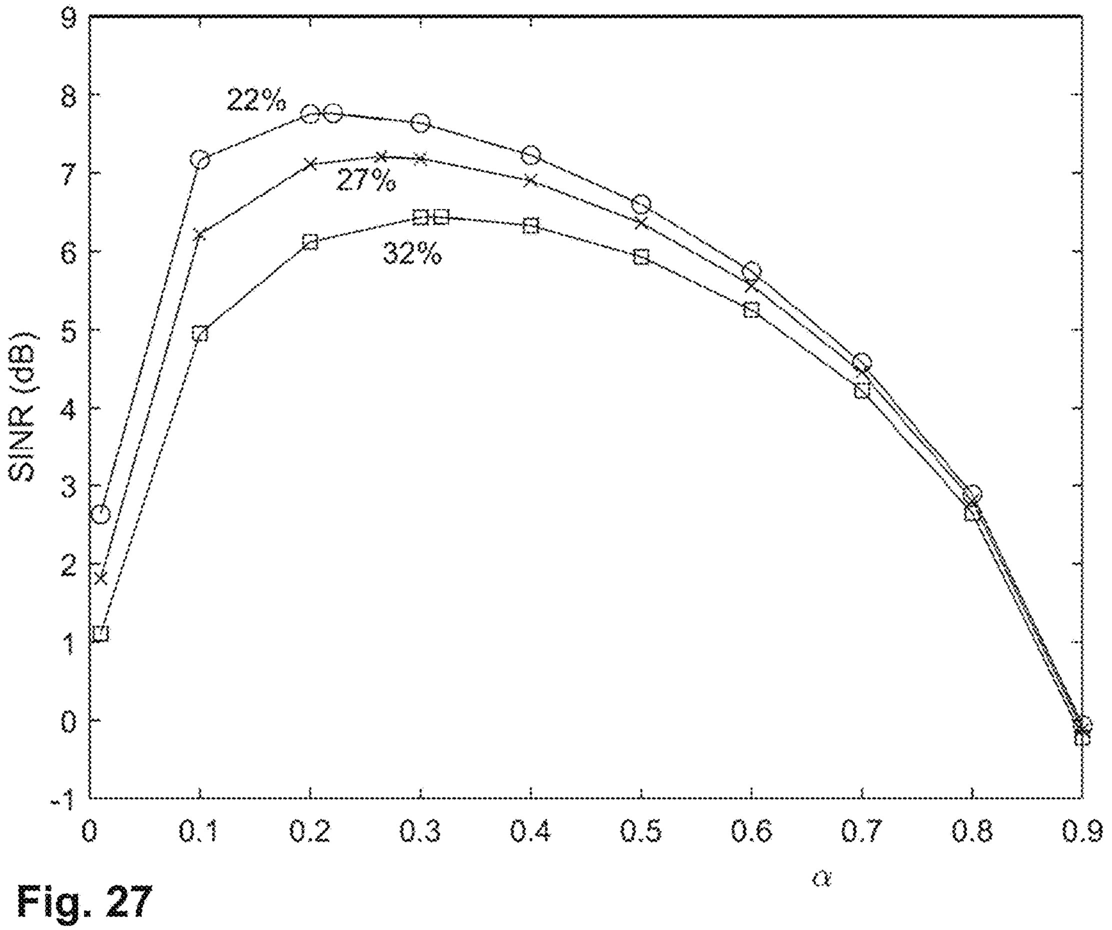
FIG. 27 shows a representation of the influence of an assumed Doppler spectrum on the optimal superimposed pilot power ratio α.
Figure 28:
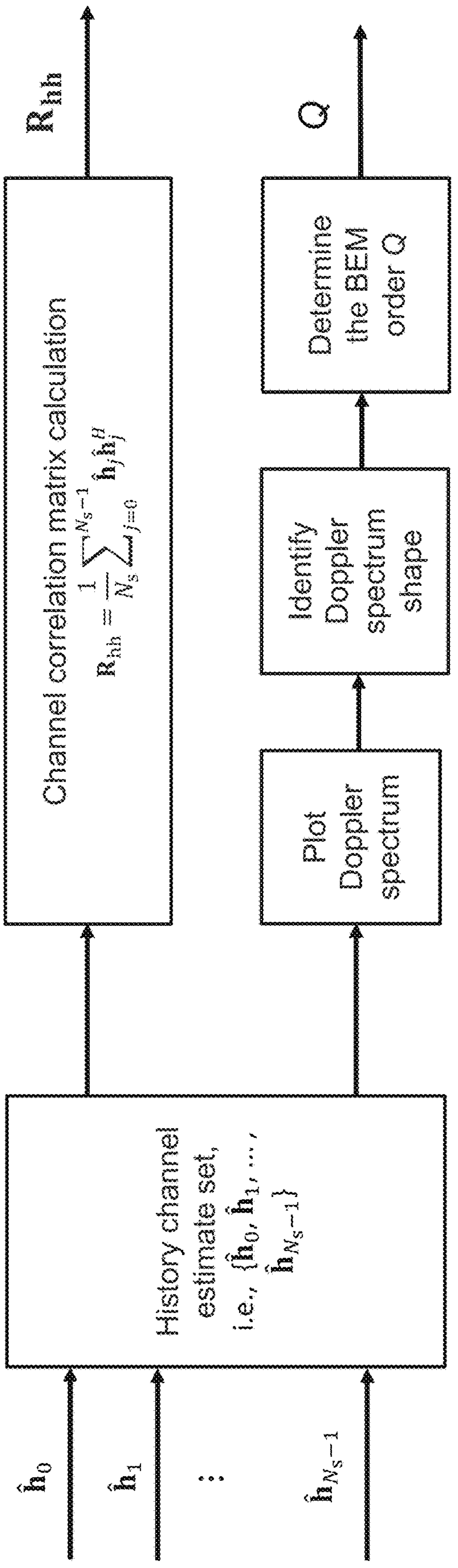
FIG. 28 shows an exemplary block diagram of the inputs to the calculation of second-order statistics of channel and for resource allocation.

FIG. 17 shows an exemplary block diagram of a transmitter 300 or a receiver 400, respectively, in accordance with embodiments of the third, fourth or fifth aspect of the present invention. The transmitter 300 or receiver 400 comprises a microprocessor 350, a volatile memory 352, a non-volatile memory 354, a wireless interface circuitry configured for communicating with a receiver or a transmitter, respectively, by transmitting and/or receiving electromagnetic signals via multiple antennas 312, 402. The aforementioned elements are communicatively connected via one or more signal or data connections or buses 358. The non-volatile memory 354 stores computer program instructions which, when executed by the microprocessor 350, cause the transmitter 300 or receiver 400 to execute the method according to the first, second or third aspect of the present invention as presented herein.

LIST OF REFERENCE NUMERALS (PART OF THE DESCRIPTION)

| | |
|---|---|
| 100 | method of transmitting |
| 102 | receive binary data sequence |
| 104 | encode binary data sequence |
| 106 | interleaving encoded data |
| 108 | mapping |
| 110 | receive OTFS system information |
| 112 | receive channel information |
| 114 | determine pilot power ratio |
| 116 | provide determined pilot power ratio |
| 118 | superimpose pilots |
| 120 | OTFS modulator |
| 122 | transmit |
| 200 | method of receiving |
| 202 | OTFS demodulation |
| 204 | channel estimation |
| 206 | signal detection |
| 208 | de-mapping |
| 210, 210' | de-interleaving |
| 212, 212' | reconstruct data |
| 214 | determine values related to probabilities or likelihoods |
| 216 | termination criterion met? |
| 218 | interleave |
| 220 | feed back |
| 222 | receiver-side mapping |
| 224 | output reconstructed data |
| 300 | transmitter |
| 302 | channel encoder |
| 304 | interleaver |
| 306 | signal mapper |
| 308 | pilot signal adding unit |
| 310 | OTFS modulator |
| 312 | antenna |
| 350 | microprocessor |
| 352 | volatile memory |
| 354 | non-volatile memory |
| 356 | wireless interface circuitry |
| 358 | signal/data connection/bus |
| 400 | receiver |
| 402 | antenna |
| 404 | OTFS demodulator |
| 406 | channel estimator |
| 408 | signal detector |
| 410 | signal de-mapper |
| 412 | de-interleaver |
| 414 | channel decoder |
| 416 | interleaver |
| 418 | signal mapper |

The invention claimed is:

1. A method of transmitting a binary data sequence over an Orthogonal Time Frequency Space (OTFS) communication channel subject to Doppler-spread comprising:

receiving the binary data sequence to be transmitted, encoding the binary data sequence in a channel encoder, yielding a coded bit stream, mapping the coded bit stream to data symbols, superimposing pilot signals onto the data symbols, yielding a transmit signal, modulating the transmit signal, and transmitting a modulated signal over the OTFS communication channel, wherein the method further comprises, prior to the superimposing:

receiving information about OTFS system parameters, including one or more of a number of delay grids, a number of Doppler grids, a carrier frequency, and a subcarrier spacing, receiving information about the OTFS communication channel, including one or more of channel frequency autocorrelation matrix, the channel length, the basis expansion modelling (BEM) order, and the Gaussian noise variance, determining a pilot signal power ratio to be used for superimposing using solely the received OTFS system parameters and the received OTFS channel information as input, and providing the determined pilot signal power ratio to the superimposing step.

2. The method of claim 1 further comprising, prior to mapping the coded bit stream to the data symbols:

interleaving the binary data sequence or the coded bit stream.

3. The method of claim 2, wherein receiving the OTFS channel information comprises performing a channel estimation on a signal received by a receiver co-located with a transmitter executing the method, for determining one or more of the OTFS channel information.

4. A transmitter of an OTFS transmission system wherein the channel encoder is adapted to receive a binary data sequence, the transmitter comprising a signal mapper configured to receive an output from the channel encoder, a pilot signal adding unit, and an OTFS modulator connected to one or more antennas, wherein the pilot signal adding unit is further configured to optimise the pilot signal power ratio in accordance with the method of claim 2.

5. A wireless communication device comprising one or more microprocessors, volatile and non-volatile memory, a wireless interface circuitry configured for transmitting electromagnetic signals via one or multiple antennas, wherein the non-volatile memory stores computer program instructions which, when executed by the microprocessor, configure the wireless device to execute the method of claim 2.

6. The method of claim 1, wherein receiving the OTFS channel information comprises performing a channel estimation on a signal received by a receiver co-located with a transmitter executing the method, for determining one or more of the OTFS channel information.

7. A transmitter of an OTFS transmission system wherein the channel encoder is adapted to receive a binary data sequence, the transmitter comprising a signal mapper configured to receive an output from the channel encoder, a pilot signal adding unit, and an OTFS modulator connected to one or more antennas, wherein the pilot signal adding unit is further configured to optimise the pilot signal power ratio in accordance with the method of claim 6.

8. A wireless communication device comprising one or more microprocessors, volatile and non-volatile memory, a wireless interface circuitry configured for transmitting electromagnetic signals via one or multiple antennas, wherein the non-volatile memory stores computer program instructions which, when executed by the microprocessor, configure the wireless device to execute the method of claim 6.

9. A transmitter of an OTFS transmission system wherein the channel encoder is adapted to receive the binary data sequence, the transmitter comprising a signal mapper configured to receive an output from the channel encoder, a pilot signal adding unit, and an OTFS modulator connected to one or more antennas, wherein the pilot signal adding unit is further configured to optimise the pilot signal power ratio in accordance with the method of claim 1.

10. The transmitter of claim 9, further comprising an interleaver upstream of the signal mapper.

11. A wireless communication device comprising one or more microprocessors, volatile and non-volatile memory, a wireless interface circuitry configured for transmitting electromagnetic signals via one or multiple antennas, wherein the non-volatile memory stores computer program instructions which, when executed by the microprocessor, configure the wireless device to execute the method of claim 1.

12. A non-transitory computer program product comprising computer program instructions which, when executed by a microprocessor of a wireless communication device configured as a transmitter, cause the microprocessor to execute the method in accordance with claim 1 and to accordingly control hardware components of a transmitter of an OTFS communication system wherein the channel encoder adapted to receive the binary data sequence, a signal mapper configured to receive an output from the channel encoder, a pilot signal adding unit, and an OTFS modulator connected to one or more antennas, wherein the pilot signal adding unit is configured to optimise the pilot signal power ratio.

13. A non-transitory computer readable medium retrievably transmitting or storing the computer program product of claim 12.

* * * * *